United States Patent
Yi

(10) Patent No.: US 12,001,673 B2
(45) Date of Patent: Jun. 4, 2024

(54) SPLIT-SCREEN DISPLAY METHOD AND ELECTRONIC DEVICE

(71) Applicant: Honor Device Co., Ltd., Shenzhen (CN)

(72) Inventor: Jie Yi, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/797,998

(22) PCT Filed: Oct. 21, 2021

(86) PCT No.: PCT/CN2021/125425
§ 371 (c)(1),
(2) Date: Aug. 5, 2022

(87) PCT Pub. No.: WO2022/037726
PCT Pub. Date: Feb. 24, 2022

(65) Prior Publication Data
US 2023/0059017 A1 Feb. 23, 2023

(30) Foreign Application Priority Data
Aug. 21, 2020 (CN) .......................... 202010850840.2

(51) Int. Cl.
*G06F 3/048* (2013.01)
*G06F 3/04817* (2022.01)
(Continued)

(52) U.S. Cl.
CPC ...... *G06F 3/04886* (2013.01); *G06F 3/04817* (2013.01); *G06F 3/0486* (2013.01); *G06F 3/04847* (2013.01); *G06F 2203/04803* (2013.01)

(58) Field of Classification Search
CPC ............ G06F 3/04886; G06F 3/04817; G06F 3/0486; G06F 3/04847; G06F 2203/04803
See application file for complete search history.

(56) References Cited

U.S. PATENT DOCUMENTS 9,146,672 B2 * 9/2015 Hicks .................. G06F 3/04812
9,891,809 B2   2/2018 Jung et al.
(Continued)

FOREIGN PATENT DOCUMENTS

CN    104516763 A     4/2015
CN    104536795 A  *  4/2015
(Continued)

*Primary Examiner* — Rashawn N Tillery
(74) *Attorney, Agent, or Firm* — Conley Rose, P.C.

(57) ABSTRACT

Embodiments of this application provide a split-screen display method and an electronic device, which are applied to the field of terminal technologies. The method includes: receiving a first operation for an application; displaying, in response to the first operation, an icon of the application as a first state on a display screen, where the first state is used to identify that a split-screen display operation can be performed for a plurality of functions of the application; receiving a second operation for the icon in the first state; and respectively displaying, in response to the second operation, interfaces corresponding to the plurality of functions of the application in a plurality of split-screen areas. In the embodiments of this application, an application icon may be triggered on an interface of a terminal device, to implement split-screen displaying of a function of an application, thereby simplifying a manner of opening different functions of the application and improving user experience.

20 Claims, 20 Drawing Sheets

(51) Int. Cl.
   *G06F 3/0486* (2013.01)
   *G06F 3/04886* (2022.01)
   *G06F 3/04847* (2022.01)

(56) References Cited

U.S. PATENT DOCUMENTS

| | | | | |
|---|---|---|---|---|
| 2010/0248788 | A1* | 9/2010 | Yook | G06F 3/04886 |
| | | | | 455/566 |
| 2011/0283212 | A1* | 11/2011 | Warner | G06F 3/0486 |
| | | | | 715/830 |
| 2013/0346912 | A1* | 12/2013 | Buening | G06F 3/0482 |
| | | | | 715/783 |
| 2014/0096069 | A1 | 4/2014 | Boblett et al. | |
| 2015/0193129 | A1* | 7/2015 | Cho | G06F 3/0482 |
| | | | | 715/739 |
| 2018/0329550 | A1* | 11/2018 | Dellinger | G06F 3/04883 |
| 2021/0117049 | A1* | 4/2021 | Zhu | G06F 3/14 |
| 2022/0334684 | A1* | 10/2022 | Sun | G06F 1/1624 |
| 2022/0334697 | A1* | 10/2022 | Xu | G06F 3/04886 |

FOREIGN PATENT DOCUMENTS

| | | | | |
|---|---|---|---|---|
| CN | 104536795 | A | | 4/2015 |
| CN | 105164714 | A | | 12/2015 |
| CN | 105760045 | A * | 7/2016 | |
| CN | 105760045 | A | | 7/2016 |
| CN | 109032484 | A | | 12/2018 |
| CN | 109992336 | A * | 7/2019 | |
| CN | 111857460 | A * | 10/2020 | |
| WO | WO-2007102453 | A1 * | 9/2007 | ......... H04L 12/1822 |
| WO | 2015192085 | A1 | | 12/2015 |
| WO | 2018213241 | A1 | | 11/2018 |
| WO | WO-2022068483 | A1 * | 4/2022 | |
| WO | WO-2023024996 | A1 * | 3/2023 | |

\* cited by examiner

SPLIT-SCREEN DISPLAY METHOD AND ELECTRONIC DEVICE

CROSS-REFERENCE TO RELATED APPLICATIONS

This application is a U.S. National Stage of International Application No. PCT/CN2021/125425 filed on Oct. 21, 2021, which claims priority to Chinese Patent Application No. 202010850840.2, filed with the China National Intellectual Property Administration on Aug. 21, 2020, both of which are incorporated herein by reference in their entireties.

TECHNICAL FIELD

This application relates to the field of terminal technologies, and in particular, to a split-screen display method and an electronic device.

BACKGROUND

Currently, with development of terminal technologies, users' function requirements for an electronic device are more diversified. To improve screen utilization and avoid frequent switching between a plurality of applications, more electronic devices support split-screen displaying.

In a conventional technology, to implement screen splitting for a plurality of functions of a same application, generally it is necessary to first open the application, and then drag a sub-function from the application to a screen edge, or drag the application from a dock (DOCK) area and drag the sub-function to a to-be-split-screen area again.

However, in the foregoing screen splitting manner, a user needs to perform operations for a plurality of times, the process is cumbersome, and user experience is poor.

SUMMARY

Embodiments of this application provide a split-screen display method and an electronic device, which simplify a manner of opening a function of an application.

According to a first aspect, an embodiment of this application provides a split-screen display method, applied to an electronic device, where the electronic device includes a display screen, and the display screen includes a plurality of split-screen areas. The method includes: receiving a first operation for an application; displaying, in response to the first operation, an icon of the application as a first state on a display screen, where the first state is used to identify that a split-screen display operation can be performed for a plurality of functions of the application; receiving a second operation for the icon in the first state; and respectively displaying, in response to the second operation, interfaces corresponding to the plurality of functions of the application in a plurality of split-screen areas. In this way, in this embodiment of this application, an application icon may be triggered on an interface of a terminal device, to implement split-screen displaying of different functions of an application, thereby simplifying a manner of opening different functions of the application and improving user experience.

In a possible implementation, the receiving a second operation for the icon in the first state includes: receiving a continuous touch operation for the icon in the first state and a plurality of drag operations; and the respectively displaying, in response to the second operation, interfaces corresponding to the plurality of functions of the application in the plurality of split-screen areas includes: displaying, in response to each drag operation on a basis of the continuous touch operation for the icon in the first state, an interface corresponding to a function of the application in a split-screen area corresponding to the drag operation. In this way, a user can perform a drag operation for an application, so as to implement split-screen displaying of a function of the application on a terminal device.

In a possible implementation, the displaying an interface corresponding to a function of the application in a split-screen area corresponding to the drag operation includes: displaying, in a split-screen area corresponding to an end position of the drag operation, the interface corresponding to the function of the application. In this way, the terminal device can display; in the split-screen area corresponding to the end position of the drag operation, the interface corresponding to the function of the application.

In a possible implementation, the displaying an interface corresponding to a function of the application in a split-screen area corresponding to the drag operation includes: displaying, in a split-screen area to which a drag direction of the drag operation points, the interface corresponding to the function of the application. In this way, the terminal device can display, in the split-screen area to which the drag pointing direction of the drag operation points, the interface corresponding to the function of the application.

In a possible implementation, the displaying, in a split-screen area to which a drag direction of the drag operation points, the interface corresponding to the function of the application includes: in a case that a pressing force of the drag operation is greater than a first pressure threshold, displaying, in the split-screen area to which the drag direction of the drag operation points, the interface corresponding to the function of the application. In this way, when the user performs the drag operation in the drag pointing direction to trigger split-screen displaying of the function of the application, in a case that the pressing force of the drag operation is greater than the first pressure threshold, the terminal device can display; in the split-screen area corresponding to the drag pointing direction, the interface corresponding to the function of the application.

In a possible implementation, the icon in the first state includes: the icon of the application and identifiers of the plurality of functions of the application; and the continuous touch operation includes a continuous touch operation for the icon of the application, and the drag operation includes a drag operation for the identifiers of the plurality of functions. In this way, the user can perform a drag operation on the identifiers of the plurality of functions of the application, so as to implement split-screen displaying of the functions of the application on the terminal device.

In a possible implementation, the receiving a second operation for the icon in the first state includes: receiving slide operations that slide in two different directions at the same time for the icon in the first state; and the respectively displaying, in response to the second operation, interfaces corresponding to the plurality of functions of the application in the plurality of split-screen areas includes: duplicating the icon of the application into a plurality of duplicated icons based on the directions of the slide operations, and displaying the plurality of duplicated icons in positions corresponding to the plurality of split-screen areas with the slide operations proceed, where the positions of the plurality of split-screen areas on the display screen are related to the directions of the slide operations; and in a case that the slide operations end, respectively displaying, in the plurality of split-screen areas, the interfaces corresponding to the plurality of functions of the application. In this way, the user can perform a slide operation for the application, so as to implement split-screen displaying of the function of the application on the terminal device.

In a possible implementation, the duplicating the icon of the application into a plurality of duplicated icons based on the directions of the slide operations, and displaying the plurality of duplicated icons in positions corresponding to the plurality of split-screen areas with the slide operations proceed includes: in a case that a pressing force of the slide operations is greater than a second pressure threshold, duplicating the icon of the application into a plurality of duplicated icons based on the directions of the slide operations, and respectively displaying the plurality of duplicated icons in the positions corresponding to the plurality of split-screen areas. In this way, when the user performs the operation of sliding to trigger split-screen displaying of the function of the application, in a case that the pressing force of the slide operation is greater than the second pressure threshold, split-screen displaying of the function of the application on the terminal device can be implemented.

In a possible implementation, when the slide operation is an operation of sliding up and down relative to the display screen, the plurality of split-screen areas are split-screen areas in up and down directions relative to the display screen; or when the slide operation is an operation of sliding left and right relative to the display screen, the plurality of split-screen areas are split-screen areas in left and right directions relative to the display screen. In this way, when the user performs two slide operations that slide in opposite directions, the terminal device can implement split-screen displaying of functions of the application in split-screen areas corresponding to different slide directions.

In a possible implementation, the respectively displaying interfaces corresponding to the plurality of functions of the application in the plurality of split-screen areas includes: in a case that a quantity of functions of the application is greater than a quantity of the plurality of split-screen areas, displaying identifiers of the plurality of functions of the application in a first split-screen area of the plurality of split-screen areas, and/or respectively displaying corresponding interfaces of other functions of the application in other split-screen areas of the plurality of split-screen areas, where the other functions are different from those displayed in the first split-screen display area.

In a possible implementation, the method further includes: receiving a third operation for the identifiers of the plurality of functions of the application in the first split-screen area; and displaying, in the first split-screen area in response to the third operation, an interface of a function targeted by the third operation. In this way, the user can trigger any function in the split-screen area by performing the third operation, and the terminal device displays an interface corresponding to the function in the first split-screen area.

In a possible implementation, the method further includes: receiving a setting operation for the application, where the setting operation is used to set interfaces of a plurality of specifically displayed first target functions when the interfaces of the plurality of functions of the application are displayed in the split-screen areas; and the respectively displaying, in response to the second operation, interfaces corresponding to the plurality of functions of the application in the plurality of split-screen areas includes: respectively displaying, in response to the second operation, interfaces corresponding to the plurality of first target functions in the plurality of split-screen areas. In this way, the user can set a plurality of specifically displayed functions when the interfaces of the plurality of functions of the application are displayed in the split-screen areas.

In a possible implementation, the respectively displaying interfaces corresponding to the plurality of functions of the application in the plurality of split-screen areas includes: respectively displaying, in the plurality of split-screen areas, interfaces corresponding to a plurality of second target functions of the application, where the plurality of second target functions include: a plurality of functions that are in the application and whose trigger frequencies meet a preset condition in a first time period, or a plurality of functions that are displayed when most recent split-screen displaying of a plurality of functions is performed in the application. In this way, when the user does not set a function of an application that specifically needs to be displayed during split-screen displaying, the terminal device can display interfaces of a plurality of functions of the user that have relatively high frequencies of using email, or the terminal device may display, in a plurality of split-screen areas, interfaces of functions memorized when the user recently performs split-screen displaying of the function of the email.

In a possible implementation, after the respectively displaying interfaces corresponding to the plurality of functions of the application in the plurality of split-screen areas, the method further includes: receiving a fourth operation for a second split-screen area in the plurality of split-screen areas; and switching a display interface of the second split-screen area to the identifiers of the plurality of functions of the application in response to the fourth operation. In this way, the user can perform the fourth operation to switch the display interface of the split-screen area.

In a possible implementation, the method further includes: receiving a fifth operation for the identifiers of the plurality of functions of the application in the second split-screen area; and displaying, in the second split-screen area in response to the fifth operation, an interface of a function targeted by the fifth operation. In this way, the user can perform the fifth operation to switch the display interface of the split-screen area to the second split-screen area triggered by the user.

In a possible implementation, the method further includes: receiving a sixth operation for a third split-screen area in the plurality of split-screen areas; and displaying in full screen content displayed in the third split-screen area in response to the sixth operation. In this way, the user can perform the sixth operation to exit one of the split-screen areas, and the terminal device displays in full screen the interface displayed in the third split-screen area.

According to a second aspect, an embodiment of this application provides a split-screen display apparatus, where the split-screen display apparatus may be a terminal device, or may be a chip or a chip system in the terminal device. The split-screen display apparatus may include a display unit and a processing unit. When the split-screen display apparatus is a terminal device, the display unit herein may be a display screen. The display unit is configured to perform a display step, so that the terminal device implements the split-screen display method described in any one of the first aspect or the possible implementations of the first aspect. When the split-screen display apparatus is a terminal device, the processing unit may be a processor. The split-screen display apparatus may further include a storage unit, and the storage unit may be a memory. The storage unit is configured to store instructions, and the processing unit executes the instructions stored in the storage unit, so that the terminal device implements the split-screen display method described in any one of the first aspect or the possible implementations of the first aspect. When the split-screen display apparatus is a chip or a chip system in a terminal device, the processing unit may be a processor. The processing unit executes the instructions stored in the storage unit, so that the terminal device implements the split-screen display method described in any one of the first aspect or the possible implementations of the first aspect. The storage unit may be a storage unit (for example, a register or a cache) in the chip, or may be a storage unit (for example, a read-only memory or a random access memory) located outside the chip in the terminal device.

For example, the processing unit is configured to receive a first operation for an application; the display unit is configured to display, in response to the first operation, an icon of the application as a first state on a display screen, where the first state is used to identify that a split-screen display operation can be performed for a plurality of functions of the application; the processing unit is further configured to receive a second operation for the icon in the first state; and the display unit is further configured to respectively display, in response to the second operation, interfaces corresponding to the plurality of functions of the application in a plurality of split-screen areas.

In a possible implementation, the processing unit is specifically configured to receive a continuous touch operation for the icon in the first state and a plurality of drag operations; and the display unit is specifically configured to display, in response to each drag operation on a basis of the continuous touch operation for the icon in the first state, an interface corresponding to a function of the application in a split-screen area corresponding to the drag operation.

In a possible implementation, the display unit is specifically configured to display, in a split-screen area corresponding to an end position of the drag operation, the interface corresponding to the function of the application.

In a possible implementation, the display unit is specifically configured to display, in a split-screen area to which a drag direction of the drag operation points, the interface corresponding to the function of the application.

In a possible implementation, the display unit is specifically configured to: in a case that a pressing force of the drag operation is greater than a first pressure threshold, display, in the split-screen area to which the drag direction of the drag operation points, the interface corresponding to the function of the application.

In a possible implementation, the icon in the first state includes: the icon of the application and identifiers of the plurality of functions of the application; and the continuous touch operation includes a continuous touch operation for the icon of the application, and the drag operation includes a drag operation for the identifiers of the plurality of functions.

In a possible implementation, the processing unit is specifically configured to receive slide operations that slide in two different directions at the same time for the icon in the first state; and the display unit is specifically configured to: duplicate the icon of the application into a plurality of duplicated icons based on the directions of the slide operations, and display the plurality of duplicated icons in positions corresponding to the plurality of split-screen areas with the slide operations proceed, where the positions of the plurality of split-screen areas on the display screen are related to the directions of the slide operations; and in a case that the slide operations end, respectively display, in the plurality of split-screen areas, the interfaces corresponding to the plurality of functions of the application.

In a possible implementation, the display unit is specifically configured to: in a case that a pressing force of the slide operations is greater than a second pressure threshold, duplicate the icon of the application into a plurality of duplicated icons based on the directions of the slide operations, and respectively display the plurality of duplicated icons in the positions corresponding to the plurality of split-screen areas.

In a possible implementation, the display unit is specifically configured to: when the slide operation is an operation of sliding up and down relative to the display screen, the plurality of split-screen areas are split-screen areas in up and down directions relative to the display screen; or the display unit is further specifically configured to: when the slide operation is an operation of sliding left and right relative to the display screen, the plurality of split-screen areas are split-screen areas in left and right directions relative to the display screen.

In a possible implementation, the display unit is specifically configured to: in a case that a quantity of functions of the application is greater than a quantity of the plurality of split-screen areas, display identifiers of the plurality of functions of the application in a first split-screen area of the plurality of split-screen areas, and/or the display unit is further specifically configured to: respectively display corresponding interfaces of other functions of the application in other split-screen areas of the plurality of split-screen areas, where the other functions are different from those displayed in the first split-screen display area.

In a possible implementation, the processing unit is specifically configured to: receive a third operation for the identifiers of the plurality of functions of the application in the first split-screen area; and the display unit is specifically configured to: display, in the first split-screen area in response to the third operation, an interface of a function targeted by the third operation.

In a possible implementation, the display unit is specifically configured to: receive a setting operation for the application, where the setting operation is used to set interfaces of a plurality of specifically displayed first target functions when the interfaces of the plurality of functions of the application are displayed in the split-screen areas; and the display unit is further specifically configured to: respectively display, in response to the second operation, interfaces corresponding to the plurality of first target functions in the plurality of split-screen areas.

In a possible implementation, the display unit is specifically configured to: display a plurality of functions that are in the application and whose trigger frequencies meet a preset condition in a first time period, or a plurality of functions that are displayed when most recent split-screen displaying of a plurality of functions is performed in the application.

In a possible implementation, the processing unit is specifically configured to receive a fourth operation for a second split-screen area in the plurality of split-screen areas; and the display unit is specifically configured to switch a display interface of the second split-screen area to the identifiers of the plurality of functions of the application in response to the fourth operation.

In a possible implementation, the processing unit is specifically configured to receive a fifth operation for the identifiers of the plurality of functions of the application in the second split-screen area; and the display unit is specifically configured to display, in the second split-screen area in response to the fifth operation, an interface of a function targeted by the fifth operation.

In a possible implementation, the processing unit is specifically configured to receive a sixth operation for a third split-screen area in the plurality of split-screen areas; and the display unit is specifically configured to display in full screen content displayed in the third split-screen area in response to the sixth operation.

According to a third aspect, an embodiment of this application provides an electronic device, including a unit configured to perform any method of the first aspect or any possible implementation of the first aspect.

According to a fourth aspect, an embodiment of this application provides an electronic device, including a processor, a display screen, and an interface circuit, where the interface circuit is configured to communicate with another apparatus; the display screen is configured to perform a display step; and the processor is configured to run a code instruction to implement any method of the first aspect or any possible implementation of the first aspect.

According to a fifth aspect, an embodiment of this application provides a computer-readable storage medium, where the computer-readable storage medium stores instructions, and when the instructions are executed, any method of the first aspect or any possible implementation of the first aspect is implemented.

It should be understood that the second aspect to the fifth aspect of this application correspond to the technical solution of the first aspect of this application, and the beneficial effects obtained by each aspect and the corresponding feasible implementations are similar. Details are not described herein again.

DESCRIPTION OF EMBODIMENTS

Figure 1:
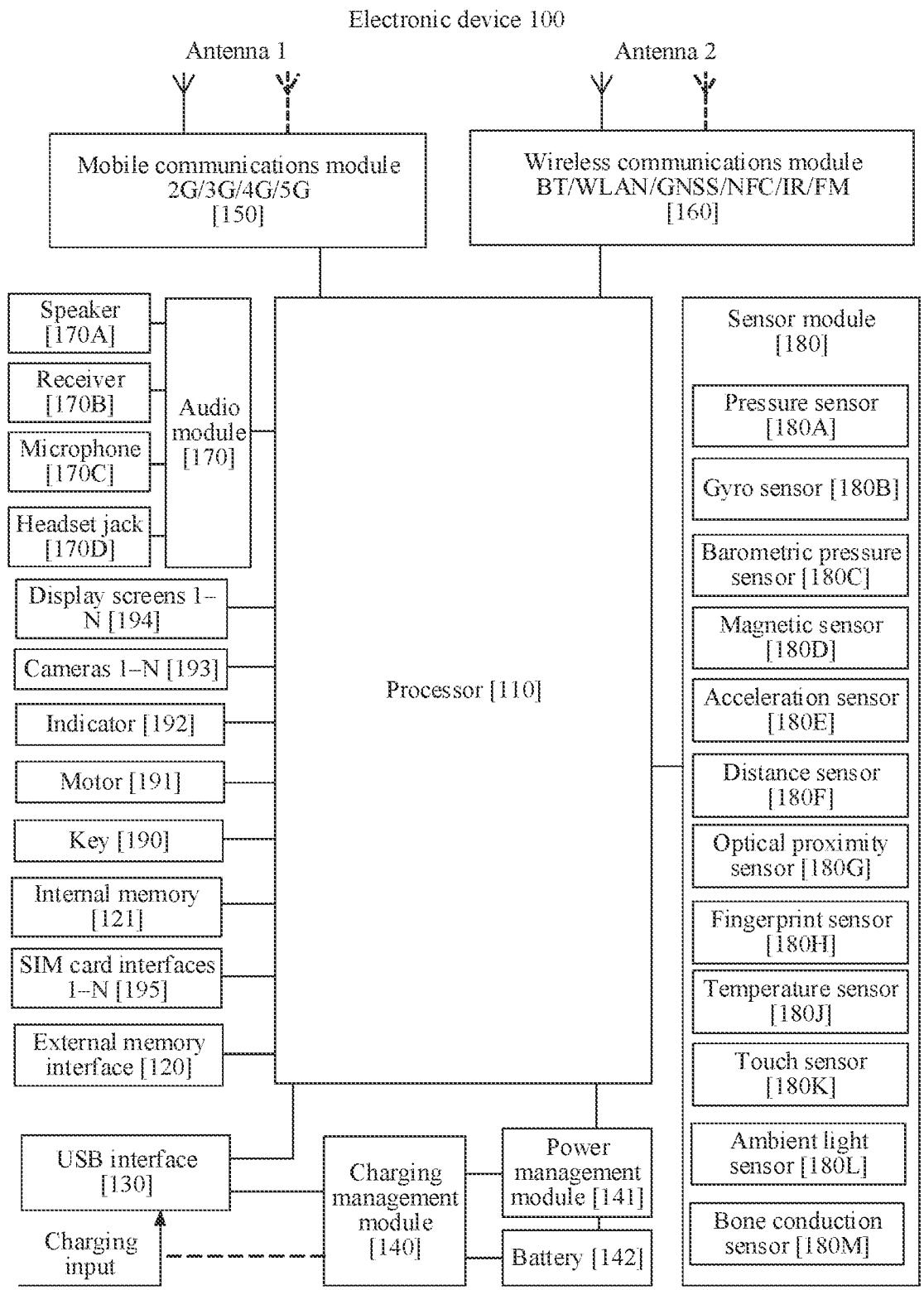
FIG. 1 is a schematic structural diagram of a terminal device 100 according to an embodiment of this application.

For ease of describing the technical solutions in the embodiments of this application clearly, in the embodiments of this application, words such as "first" and "second" are used to distinguish same or similar items with a basically same function and role. For example, the interface of the first target function and the interface of the second target function are to distinguish different response interfaces, and are not intended to limit a sequence thereof. A person skilled in the art may understand that the terms "first", "second", and the like, and do not limit a quantity and an execution order, and the terms "first", "second", and the like are not limited to be necessarily different.

It should be noted that in this application, the terms "example" or "for example" is used to represent giving an example, an illustration, or a description. Any embodiment or design scheme described as an "exemplary" or "for example" in this application should not be explained as being more preferred or having more advantages than another embodiment or design scheme. In particular, the terms such as "exemplary" and "example" as used herein are intended to present the related concept in a specific implementation.

A split-screen display method of a function provided in the embodiments of this application may be applied to an electronic device that has a display function. Specifically, the electronic device in the embodiments of this application includes a display screen, and the display screen includes a plurality of split-screen areas. The electronic device may receive a first operation for an application by a user; display, in response to the first operation, an icon of the application as a first state on the display screen, where the first state is used to identify that a split-screen display operation can be performed for a plurality of functions of the application: receive a second operation for the icon in the first state; and respectively display, in response to the second operation, interfaces corresponding to the plurality of functions of the application in the plurality of split-screen areas.

For example, the first operation may include a touch operation, a drag operation, a gesture trigger operation, and the like. The first operation performed by the user for the application may be as follows: The user triggers the application by using any operation such as a touch, a drag, or a gesture.

The displaying an icon of the application as a first state on the display screen may include: displaying the icon of the application on the display screen in a manner of floating, highlighting, or the like, where the first state is used to identify that a split-screen display operation can be performed for the plurality of functions of the application. In a possible understanding manner, the first state may be referred to as an active state of the application.

For example, the second operation may include a touch operation, a drag operation, a gesture trigger operation, a voice wakeup operation, a knock operation, and the like. The second operation performed by the user for the application may be triggering split-screen displaying of the function of the application by using an operation such as a touch operation, a drag operation, a gesture trigger operation, a voice wakeup operation, or a knock operation.

In a possible implementation, the second operation may include a continuous touch operation on the icon in the first state, a drag operation for a plurality of times, and the like. The second operation performed by the user for the icon in the first state may be: in a case that the user keeps continuously touching the icon in the first state, performing a drag operation on the icon in the first state for a plurality of times. For example, the user may continuously touch the icon in the first state by using one finger, and simultaneously perform a drag operation on the icon in the first state by using another finger for a plurality of times. A specific user operation of this implementation and an interface of a terminal device are described in detail in a subsequent embodiment, and details are not described herein.

In a possible implementation, the second operation may include slide operations that slide in two different directions at the same time. The second operation performed by the user for the icon in the first state may be that the user simultaneously performs two slide operations on the icon in the first state that slide in different directions. For example, the user may simultaneously perform two slide operations that slide in different directions on the icon in the first state by using two fingers. A specific user operation of this implementation and an interface of a terminal device are described in detail in a subsequent embodiment, and details are not described herein.

The electronic device may respectively display, in response to the second operation, interfaces corresponding to the plurality of functions of the application in the plurality of split-screen areas. For example, the electronic device may display, in a plurality of split-screen areas, interfaces of a plurality of functions of the user that have relatively high use frequencies for the application; or the electronic device may display, in a plurality of split-screen areas, interfaces of functions memorized when the user recently performs split-screen displaying of the functions of the application; or the electronic device may display, in a plurality of split-screen areas, interfaces of a plurality of functions customized by the user. The embodiments of this application set no limitation on a quantity of split-screen areas of the electronic device and an interface of a specifically displayed function.

In this way according to the split-screen display method of a function provided in the embodiments of this application, the application does not need to be opened, and split-screen displaying of the plurality of functions in the application can implemented by triggering the icon of the application, thereby simplifying a split-screen operation procedure.

The electronic device includes a terminal device, which may also be referred to as a terminal (terminal), user equipment (user equipment, UE), a mobile station (mobile station, MS), a mobile terminal (mobile terminal, MT), or the like. The terminal device may be a mobile phone (mobile phone), a smart TV, a wearable device, a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote surgery (remote medical surgery), a wireless terminal in a smart grid (smart grid), a wireless terminal in transportation safety (transportation safety), a wireless terminal in a smart city (smart city), a wireless terminal in a smart home (smart home), and the like. The embodiments of this application impose no limitation on a specific technology and a specific device form used by the electronic device.

To better understand the embodiments of this application, the following describes a structure of the terminal device in the embodiments of this application.

FIG. 1 is a schematic structural diagram of a terminal device 100. The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of this application does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on an instruction operation code and a timing signal, and read an instruction and control execution of the instruction.

The processor 110 may further be configured with a memory configured to store an instruction and data. In some embodiments, the memory in the processor 110 is a cache memory. The memory may store an instruction or data that is just used or used cyclically by the processor 110. If the processor 110 needs to use the instruction or the data again, the processor 110 may invoke the instruction or the data from the memory. Repeated access is avoided, and waiting time of the processor 110 is reduced, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the terminal device 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communications module 160 by using the I2S interface, to implement a function of answering a call by using a Bluetooth headset.

The PCM interface may also be used for audio communication, and samples, quantizes, and encodes an analog signal. In some embodiments, the audio module 170 may be coupled to the wireless communications module 160 by using the PCM bus interface. In some embodiments, the audio module 170 may alternatively transfer an audio signal to the wireless communications module 160 by using the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transfer an audio signal to the wireless communications module 160 by using the UART interface, to implement a function of playing music by using a Bluetooth headset.

The MIPI interface may be configured to connect the processor 110 to peripheral devices such as the display screen 194 and the camera 193. The MIP interface includes a camera serial interface (camera serial interface, CS), a display screen serial interface (display serial interface, DSO), and the like. In some embodiments, the processor 110 communicates with the camera 193 by using the CSI interface, to implement a photographing function of the terminal device 100. The processor 110 communicates with the display screen 194 by using the DSI interface, to implement a display function of the terminal device 100.

The GPIO interface may be configured by using software. The GPIO interface may be configured as a control signal, or may be configured as a data signal. In some embodiments, the GPIO interface may be configured to connect the processor 110 to the camera 193, the display screen 194, the wireless communications module 160, the audio module 170, the sensor module 180, and the like. The GPIO interface may alternatively be configured as an I2C interface, an I2S interface, a UART interface, a MIP interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the terminal device 100, or may be used for data transmission between the terminal device 100 and a peripheral device, or may be configured to connect to a headset, to play audio by using the headset. The interface may alternatively be configured to connect to another electronic device such as an AR device.

It may be understood that an interface connection relationship between the modules illustrated in this embodiment of this application is merely an example for description, and does not constitute a limitation on a structure of the terminal device 100. In some other embodiments of this application, the terminal device 100 may alternatively use an interface connection manner different from that in the foregoing embodiment, or use a combination of a plurality of interface connection manners.

The charging management module 140 is configured to receive a charging input from a charger. The charger may be a wireless charger, or may be a wired charger. In some embodiments of wired charging, the charging management module 140 may receive charging input of a wired charger by using the USB interface 130. In some embodiments of wireless charging, the charging management module 140 may receive wireless charging input by using a wireless charging coil of the terminal device 100. While charging the battery 142, the charging management module 140 may further supply power to the terminal device by using the power management module 141.

The power management module 141 is configured to connect to the battery 142, the charging management module 140, and the processor 110. The power management module 141 receives input of the battery 142 and/or the charging management module 140, and supplies power for the processor 110, the internal memory 121, the display screen 194, the camera 193, the wireless communications module 160, and the like. The power management module 141 may be further configured to monitor parameters such as a battery capacity, a cycle count of a battery, and a battery health state (leakage and impedance). In some other embodiments, the power management module 141 may alternatively be disposed in the processor 110. In some other embodiments, the power management module 141 and the charging management module 140 may alternatively be disposed in a same device.

A wireless communications function of the terminal device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. An antenna in the terminal device 100 may be configured to cover a single communications frequency band or a plurality of communications frequency bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communications module 150 can provide a solution for wireless communication including 2G/3G/4G/5G and the like to be applied to the terminal device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and send the electromagnetic wave to the modem processor for demodulation. The mobile communications module 150 may further amplify a signal modulated by the modem processor, and convert the signal into an electromagnetic wave by using the antenna 1 for radiation. In some embodiments, at least some of functional modules of the mobile communications module 150 may be disposed in the processor 110. In some embodiments, at least some of the functional modules of the mobile communications module 150 may be disposed in a same device as at least some of modules of the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then the demodulator transfers the low-frequency baseband signal obtained through demodulation to the baseband processor for processing. The low-frequency baseband signal is processed by the baseband processor and is then transferred to the application processor. The application processor outputs a sound signal by using an audio device (not limited to the speaker 170A, the phone receiver 170B, or the like), or displays an image or a video by using the display screen 194. In some embodiments, the modem processor may be an independent device. In some other embodiments, the modem processor may be independent of the processor 110, and is disposed in a same device as the mobile communications module 150 or another function module.

The wireless communications module 160 can provide a solution for wireless communication including a wireless local area network (wireless local area networks, WLAN) (such as a wireless fidelity (wireless fidelity, Wi-Fi) network), Bluetooth (bluetooth, BT), a global navigation satellite system (global navigation satellite system, GNSS), frequency modulation (frequency modulation, FM), a near field communications technology (near field communication, NFC), an infrared technology (infrared, IR) and the like to be applied to the terminal device 100. The wireless communications module 160 may be one or more devices that integrate at least one communications processing module. The wireless communications module 160 receives an electromagnetic wave by using the antenna 2, performs frequency modulation on and filters the electromagnetic wave signal, and sends a processed signal to the processor 110. The wireless communications module 160 may further receive a to-be-sent signal from the processor 110, perform frequency modulation on and amplify the to-be-sent signal, and convert the to-be-sent signal into an electromagnetic wave by using the antenna 2 for radiation.

In some embodiments, in the terminal device 100, the antenna 1 is coupled to the mobile communications module 150, and the antenna 2 is coupled to the wireless communications module 160, so that the terminal device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The terminal device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs that execute a program instruction to generate or change display information.

The display screen 194 is configured to display an image, a video, and the like. The display screen 194 includes a display panel. The display panel may use a liquid crystal display screen (liquid crystal display, LCD), an organic light-emitting diode (organic light-emitting diode, OLED), a passive matrix/organic light emitting diode or an active matrix/organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the terminal device 100 may include one or N display screens 194, where N is a positive integer greater than 1.

The terminal device 100 can implement a photographing function by using the ISP, the camera 193, the video codec, the GPU, the display screen 194, the application processor, and the like.

The ISP is configured to process data fed back by the camera 193. For example, during photographing, a shutter is opened, light is transferred to a camera photosensitive element by using a lens, an optical signal is converted into an electrical signal, and the camera photosensitive element transfers the electrical signal to the ISP for processing, to convert the electrical signal into an image visible to a naked eye. The ISP may further optimize an algorithm for noise, brightness, and complexion. The ISP may further optimize parameters such as exposure and a color temperature of a photographing scene. In some embodiments, the ISP may be disposed in the camera 193.

The camera 193 is configured to capture a static image or a video. An optical image is generated for an object by using the lens and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transfers the electrical signal to the SP, to convert the electrical signal into a digital image signal. The ISP outputs the digital image signal to the DSP for processing. The DSP converts the digital image signal into an image signal in a standard format such as RGB or YUV. In some embodiments, the terminal device 100 may include one or N cameras 193, where N is a positive integer greater than 1.

The digital signal processor is configured to process a digital signal, and may further process another digital signal in addition to a digital image signal. For example, when the terminal device 100 performs frequency channel selection, the digital signal processor is configured to perform Fourier transformation and the like on frequency channel energy.

The video codec is configured to compress or decompress a digital video. The terminal device 100 can support one or more video codecs. In this way, the terminal device 100) can play or record videos in a plurality of encoding formats, for example, moving picture experts group (moving picture experts group, MPEG)1, MPEG2, MPEG3, and MPEG4.

The NPU is a neural-network (neural-network, NN) computing processor that processes input information rapidly by referring to a structure of a biological neural network, for example, by referring to a transmission mode between human brain neurons, and can further perform self-learning continuously. Applications such as intelligent cognition of the terminal device 100, such as image recognition, facial recognition, speech recognition, and text understanding, can be implemented by using the NPU.

The external memory interface 120 may be configured to connect to an external storage card such as a micro SD card, to extend a storage capability of the terminal device 100. The external storage card communicates with the processor 110 by using the external memory interface 120, to implement a data storage function, for example, store files such as music and a video into the external storage card.

The internal memory 121 may be configured to store computer executable program code, where the executable program code includes an instruction. The internal memory 121 may include a program storage area and a data storage area. The program storage area may store an operating system, an application required by at least one function (such as a voice playing function and an image playing function), and the like. The data storage area may store data (such as audio data and an address book) created during use of the terminal device 100, and the like. In addition, the internal memory 121 may include a high-speed random access memory, and may further include a non volatile memory, for example, at least one disk storage device, a flash memory device, or a universal flash storage (universal flash storage, UFS). The processor 110 executes various functional applications and data processing of the terminal device 100 by running an instruction stored in the internal memory 121 and/or an instruction stored in the memory disposed in the processor.

The terminal device 100 can implement an audio function, for example, music playback and recording, by using the audio module 170, the speaker 170A, the phone receiver 170B, the microphone 1700, the headset jack 170D, the application processor, and the like.

The audio module 170 is configured to convert digital audio information into analog audio signal output, and is also configured to convert analog audio input into a digital audio signal. The audio module 170 may be further configured to encode and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. Music can be listened to or a hands-free call can be answered by using the speaker 170A in the terminal device 100.

The receiver 170B, also referred to as a "handset", is configured to convert an audio electrical signal into a sound signal. When a call is answered or audio information is listened to by using the terminal device 100, the phone receiver 170B may be put close to a human ear to listen to a voice.

The microphone 170C, also referred to as a "mic" and a "mike", is configured to convert a sound signal into an electrical signal. When making a call or sending a voice message, a user can make a sound near the microphone 170C through the mouth of the user to input a sound signal to the microphone 170C. At least one microphone 170C may be disposed in the terminal device 100. In some other embodiments, two microphones 170C may be disposed in the terminal device 100, to collect a sound signal and further implement a noise reduction function. In some other embodiments, alternatively, three, four, or more microphones 1700 may be disposed in the terminal device 100, to collect a sound signal, reduce noise, and further identify a sound source, implement a directional recording function, and the like.

The headset jack 170D is configured to connect to a wired headset. The headset jack 170D may be a USB interface 130, or may be a 3.5-mm open mobile electronic device platform (open mobile terminal platform, OMTP) standard interface or a cellular telecommunications industry association of the USA (cellular telecommunications industry association of the LISA, CTIA) standard interface.

The pressure sensor 180A is configured to sense a pressure signal, and can convert the pressure signal into an electrical signal. In some embodiments, the pressure sensor 180A may be disposed on the display screen 194. There are many types of pressure sensors 180A, such as a resistive pressure sensor, an inductive pressure sensor, and a capacitive pressure sensor. The capacitive pressure sensor may be a parallel plate including at least two conductive materials. When a force is applied to the pressure sensor 180A, capacitance between electrodes changes. The terminal device 100 determines intensity of the pressure based on the change in the capacitance. When a touch operation is applied to the display screen 194, the terminal device 100 detects intensity of the touch operation based on the pressure sensor 180A. The terminal device 100 may also calculate a touch position based on a detection signal of the pressure sensor 180A. In some embodiments, touch operations that are applied to a same touch position but have different touch operation intensity may correspond to different operation instructions.

The gyro sensor 180B may be configured to determine a moving posture of the terminal device 100. In some embodiments, an angular velocity of the terminal device 100 around three axes (namely x, y, and z axes) may be determined by using the gyro sensor 180B. The gyro sensor 180B may be used for image stabilization during photographing. For example, when the shutter is pressed, the gyro sensor 180B detects an angle at which the terminal device 100 jitters, calculates, based on the angle, a distance for which a lens module needs to compensate, and allows the lens to cancel the jitter of the terminal device 100 through reverse motion, to implement image stabilization. The gyro sensor 180B may also be used for navigation and a motion sensing game scene.

The barometric pressure sensor 180C is configured to measure barometric pressure. In some embodiments, the terminal device 100 calculates an altitude by using a barometric pressure value measured by the barometric pressure sensor 180C, to assist in positioning and navigation.

The magnetic sensor 180D includes a Hall sensor. The terminal device 100 may detect opening and closing of a flip leather case by using the magnetic sensor 180D. In some embodiments, when the terminal device 100 is a clamshell phone, the terminal device 100 may detect opening and closing of a flip cover based on the magnetic sensor 180D. Further, based on a detected opening or closing state of the leather case or a detected opening or closing state of the flip cover, a feature such as automatic unlocking of the flip cover is set.

The acceleration sensor 180E may detect magnitude of accelerations in various directions (generally on three axes) of the terminal device 100, may detect magnitude and a direction of the gravity when the terminal device 100 is static, and may be further configured to identify a posture of the terminal device, and is applied to applications such as landscape and portrait orientation switching and a pedometer.

The distance sensor 180F is configured to measure a distance. The terminal device 100 may measure the distance by using infrared or laser. In some embodiments, in a photographing scene, the terminal device 100 may use the distance sensor 180F to measure a distance to implement fast focusing.

The optical proximity sensor 180G may include, for example, a light emitting diode (LED) and an optical detector. The light emitting diode may be an infrared light emitting diode. The terminal device 100 emits infrared light by using the light emitting diode. The terminal device 100 uses a photodiode to detect infrared reflected light from an object nearby. When sufficient reflected light is detected, it may be determined that there is an object near the terminal device 100. When insufficient reflected light is detected, the terminal device 100 may determine that there is no object near the terminal device 100. The terminal device 100 may detect, by using the optical proximity sensor 180G, that the user holds the terminal device 100 close to an ear to make a call, to automatically turn off the screen for power saving.

The optical proximity sensor 180G may also be used in a smart cover mode or a pocket mode to automatically unlock or lock the screen.

The ambient light sensor 180L is configured to sense ambient light brightness. The terminal device 100 may adaptively adjust brightness of the display screen 194 based on the sensed ambient light brightness. The ambient light sensor 180L may also be configured to automatically adjust white balance during photographing. The ambient light sensor 180L may also cooperate with the optical proximity sensor 180G to detect whether the terminal device 100 is in a pocket to prevent a false touch.

The fingerprint sensor 180H is configured to collect a fingerprint. The terminal device 100 may use a feature of the collected fingerprint to implement fingerprint-based unlocking, accessing an application lock, fingerprint-based photographing, fingerprint-based call answering, and the like.

The temperature sensor 180J is configured to detect a temperature. In some embodiments, the terminal device 100 executes a temperature processing policy by using the temperature detected by the temperature sensor 180J. For example, when the temperature reported by the temperature sensor 180J exceeds a threshold, the terminal device 100 lowers performance of a processor located near the temperature sensor 1803, to reduce power consumption to implement thermal protection. In some other embodiments, when the temperature is below another threshold, the terminal device 100 heats the battery 142 to prevent the low temperature from causing the terminal device 100 to shut down abnormally. In some other embodiments, when the temperature is below still another threshold, the terminal device 100 boosts an output voltage of the battery 142 to prevent abnormal shutdown caused by the low temperature.

The touch sensor 180K is also referred to as a "touch device". The touch sensor 180K may be disposed in the display screen 194, and the touch sensor 180K and the display screen 194 constitute a "touchscreen". The touch sensor 180K is configured to detect a touch operation on or near the touch sensor 180K. The touch sensor may transfer the detected touch operation to the application processor to determine a type of the touch event. Visual output related to the touch operation may be provided by using the display screen 194. In some other embodiments, the touch sensor 180K may also be disposed on a surface of the terminal device 100 at a position different from that of the display screen 194.

The bone conduction sensor 180M may collect a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may also be disposed in the headset, to combine into a bone conduction headset. The audio module 170 may parse out a voice signal based on the vibration signal of the vibration bone of the vocal-cord part that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or may be a touch key. The terminal device 100 may receive key input, generate key signal input related to a user setting and function control of the terminal device 100.

The motor 191 may generate a vibration prompt. The motor 191 may be used for an incoming call vibration prompt and a touch vibration feedback. For example, touch operations applied to different applications (for example, photographing and audio playback) may correspond to different vibration feedback effects. The motor 191 may also correspond to different vibration feedback effects for touch operations applied to different areas of the display screen 194. Different application scenarios (for example, a time reminder, information receiving, an alarm clock, and a game) may also correspond to different vibration feedback effects. Customization of a touch vibration feedback effect may also be supported.

The indicator 192 may be an indicator light that may be configured to indicate a charging state and a power change, or may be configured to indicate a message, a missed call, a notification, and the like.

The SIM card interface 195 is configured to connect to a SIM card. The SIM card may be inserted into the SIM card interface 195 or plugged from the SIM card interface 195 to come into contact with or be separated from the terminal device 100. The terminal device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may also be compatible with an external storage card. The terminal device 100 interacts with a network by using the SIM card, to implement a call function, a data communications function, and the like. In some embodiments, the terminal device 100 uses an eSIM, namely, an embedded SIM card. The eSIM card may be embedded in the terminal device 100, and cannot be separated from the terminal device 100.

A software system of the terminal device 100 may use a layered architecture, an event driven architecture, a micro core architecture, a micro service architecture, or a cloud architecture. In this embodiment of this application, an Android system of a layered architecture is used as an example to illustrate a software structure of the terminal device 100.

Figure 2:
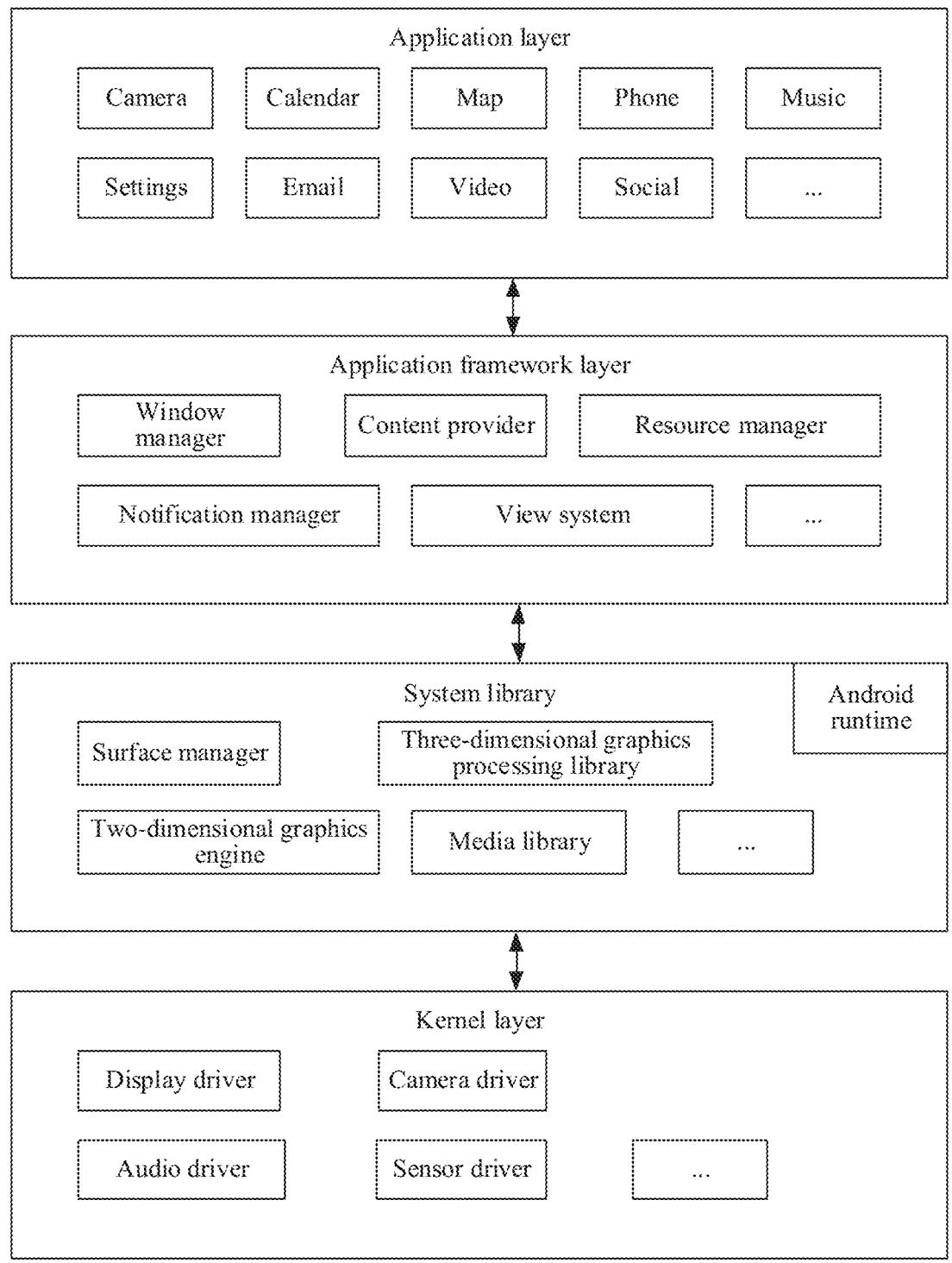
FIG. 2 is a schematic structural diagram of software of a terminal device 100 according to an embodiment of this application.

FIG. 2 is a block diagram of the software structure of the terminal device 100 in this embodiment of this application.

In the layered architecture, software is divided into several layers, and each layer has a clear role and task. The layers communicate with each other by using a software interface. In some embodiments, the Android system is divided into four layers, namely, an application layer, an application framework layer, an Android runtime (Android runtime) and a system library, and a kernel layer from top to bottom.

The application layer may include a series of application packages.

As shown in FIG. 2, the application package may include applications such as camera, calendar, phone, map, phone, music, settings, email, video, and social.

The application framework layer provides an application programming interface (application programming interface, API) and a programming framework for an application at the application layer. The application framework layer includes some predefined functions.

As shown in FIG. 2, the application framework layer may include a window manager, a content provider, a resource manager, a view system, a notification manager, and the like.

The window manager is configured to manage a window program. The window manager may obtain a size of the display screen, determine whether there is a status bar, lock the screen, touch the screen, drag the screen, take a screenshot, and the like.

The content provider is configured to store and obtain data and make the data accessible to an application. The data may include a video, an image, an audio, made and answered calls, a browse history, a bookmark, an address book, and the like.

The view system includes visual controls such as a control for displaying a text and a control for display an image. The view system may be configured to construct an application. A display interface may include one or more views. For example, a display interface including an SMS message notification icon may include a text display view and an image display view.

The resource manager provides various resources such as a localized character string, an icon, an image, a layout file, and a video file for an application.

The notification manager enables an application to display notification information in the status bar that may be used to convey a message of a notification type, where the message may disappear automatically after a short stay without user interaction. For example, the notification manager is configured to notify a user of download completion or remind a user of a message. The notification manager may alternatively display a notification in a form of a chart or a scroll bar text in a status bar at the top of the system, for example, a notification of an application run in the background, or may display a notification in a form of a dialog window on the screen. For example, text information is prompted for in the status bar, an announcement is produced, the terminal device vibrates, or the indicator light blinks.

The Android runtime includes a core library and a virtual machine. The Android runtime is responsible for scheduling and management of the Android system.

The core library includes two parts: one is a function that needs to be called by a java language, and the other is a core library of Android.

The application layer and the application framework layer are run in the virtual machine. The virtual machine executes java files of the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG 4, H.264, MP3, AAC, AMR, JPG, and PNG.

The three-dimensional graphics processing library is configured to implement drawing of three-dimensional graphics, image rendering, synthesis, layer processing, and the like.

The 2D graphics engine is a drawing engine for 2D graphics.

The kernel layer is a layer between hardware and software. The kernel layer includes at least a display driver, a camera driver, an audio driver, and a sensor driver.

With reference to a scenario in which an application starts or interface switching occurs in the application, the following exemplarily describes a working process of software and hardware of the terminal device 100.

When the touch sensor 180K receives a touch operation, a corresponding hardware interrupt is sent to the kernel layer. The kernel layer processes the touch operation into an original input event (including information such as touch coordinates, touch strength, and a time stamp of the touch operation). The original input event is stored at the kernel layer. The application framework layer obtains the original input event from the kernel layer, and identifies a control corresponding to the input event. That the touch operation is a single touch operation is used as an example. A control corresponding to the single touch operation is a control of an email application icon. The email application invokes an interface of the application framework layer to start the email application, and further starts a display driver by invoking the kernel layer to display a function interface of the email application.

With reference to the accompanying drawings, the following describes in detail an operation process of split-screen settings of an application function in an application and a display process of a split-screen function interface that are provided in this embodiment of this application. It should be noted that in this embodiment of this application, "when . . . " may be an instantaneous occurrence time of a case, or may be a period of time after occurrence of a case, which is not specifically limited in this embodiment of this application.

In this embodiment of this application, an electronic device 100 may be used for split-screen displaying of a plurality of functions of an application. Specifically, the electronic device 100 may be a mobile phone, a tablet computer, a smart watch, a smart band, a smart headset, smart glasses, another terminal device with a display screen, or the like. This is not limited in this application.

Currently, for example, the electronic device 100 is a terminal device to describe a process in which the terminal device implements split-screen displaying of a plurality of functions of an application (application, APP)(or may be referred to as an application).

Before the terminal device performs a split-screen display step, the terminal device may set a plurality of specifically displayed functions when interfaces of the plurality of functions of the application are displayed in a split-screen area.

Figure 3A:
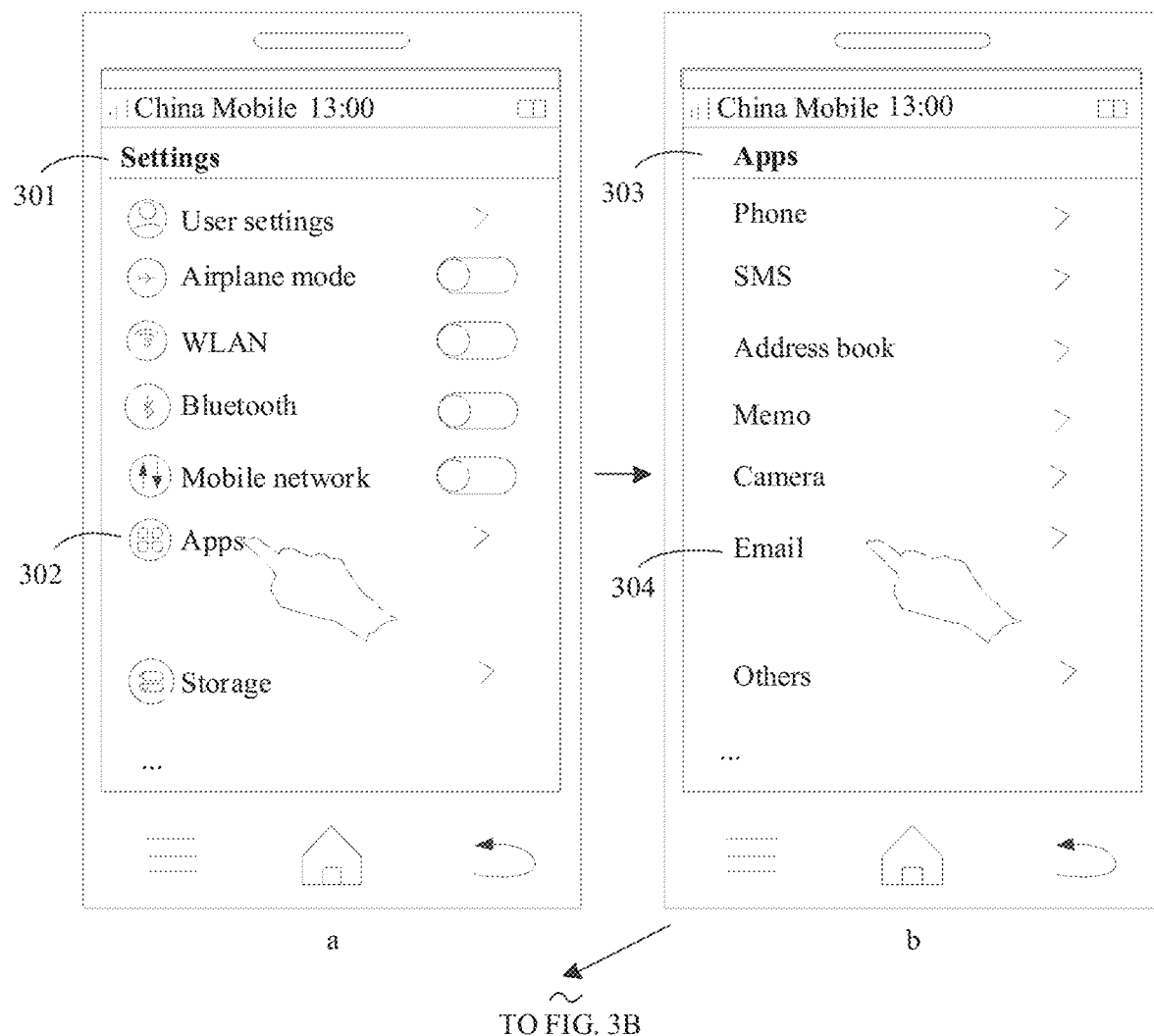
FIG. 3A and FIG. 3B are a schematic interface diagram of setting a specifically displayed function on a split-screen according to an embodiment of this application.
Figure 3B:
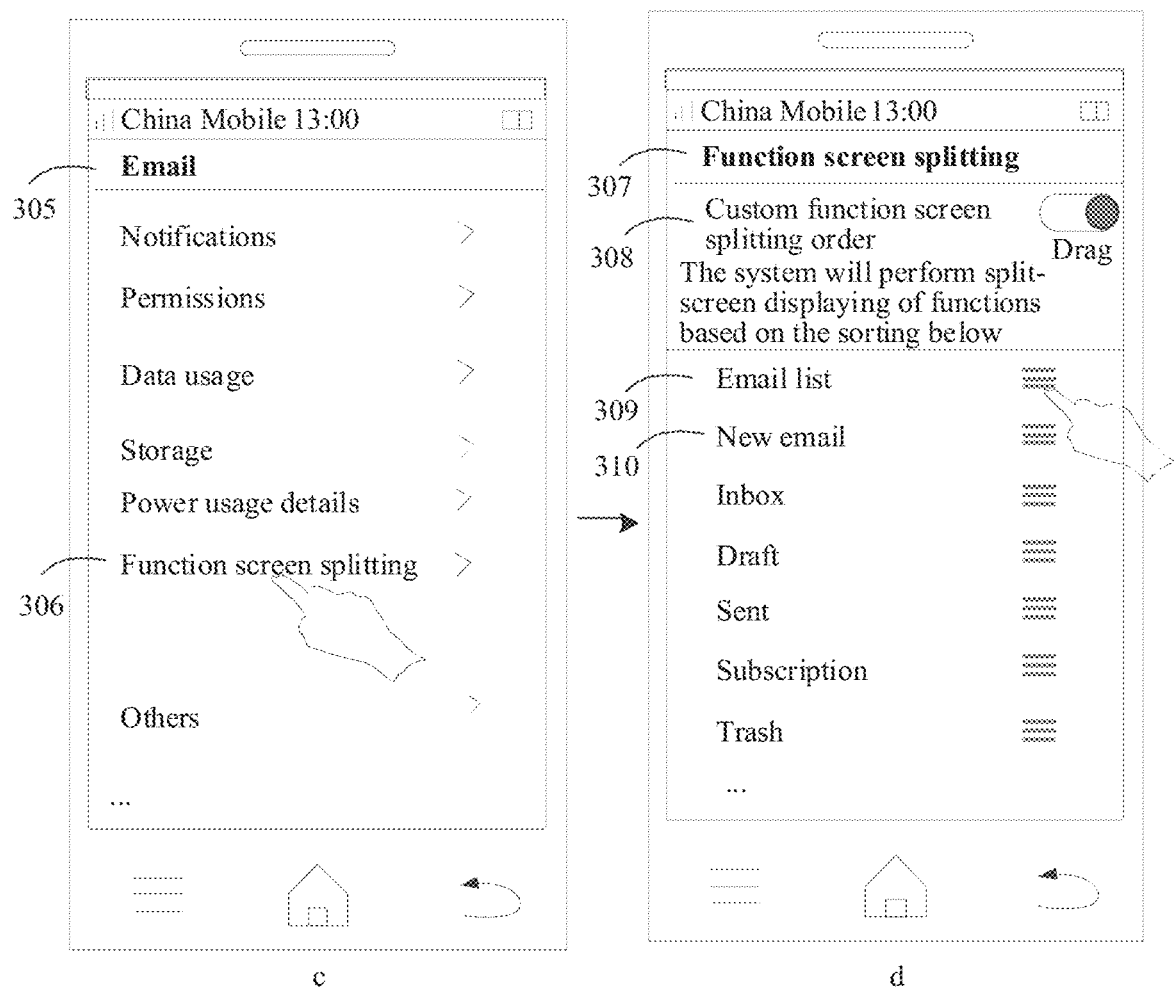

For example, FIG. 3A and FIG. 3B are a schematic diagram of an interface of setting a specifically displayed function on a split-screen.

When the terminal device receives an operation of opening a setting application of the terminal device by a user, the terminal device may enter the setting interface shown in a in FIG. 3A and FIG. 3B. As shown in a in FIG. 3A and FIG. 3B, the setting interface may include a setting label bar 301 and a setting item. For example, the setting item may include one or more of the following: user settings, flight mode, WLAN, Bluetooth, mobile network, application, storage, or another type of setting item.

When the user triggers an application control 302 in the setting interface shown in a in FIG. 3A and FIG. 3B by performing an operation such as tapping or touching, the terminal device receives an operation of setting the application 302 by the user, and the terminal device enters an application setting interface shown in b in FIG. 3A and FIG. 3B. The application setting interface may include an application label bar 303 and an application item. For example, the application item may include one or more of the following: phone, SMS, address book, memo, camera, email, or another type of application item.

When the user triggers an email control 304 in the application setting interface shown in b in FIG. 3A and FIG. 3B by performing an operation such as tapping or touching, the terminal device receives an operation of setting the email 304 by the user, and the terminal device enters an email setting interface shown in c in FIG. 3A and FIG. 3B. The email setting interface may include an email label bar 305 and an application information item. For example, the application information item may include one or more of the following: notification management, permission, traffic usage, storage, power consumption details, function split-screen, or another type of application information item.

When the user triggers a function split-screen control 306 in the email setting interface shown in c in FIG. 3A and FIG. 3B by performing an operation such as tapping or touching, the terminal device receives an operation of setting function split-screen 306 by the user, and the terminal device enters a function split-screen setting interface shown in d in FIG. 3A and FIG. 3B. The function split-screen 306 may be understood as a control used to set a function specifically displayed by the application in a split-screen area. The function split-screen setting interface may include a function split-screen label bar 307, a custom function split-screen sequence control 308, and a function item. For example, the function item may include one or more of the following: email list, new email, inbox, draft box, sent, subscription email, spam, or another type of function item.

When the user opens the custom function split-screen sequence control 308 in the function split-screen setting interface shown in d in FIG. 3A and FIG. 3B, the user may drag a function item to implement sorting of a custom function item. For example, the terminal device receives a drag operation performed by the user on an email list 309, a new email 310, or another type of function item, and may use a plurality of function items sorted in front positions as custom function items of the user. In this case, the terminal device may subsequently display interfaces of the plurality of function items of the user in a plurality of split-screen areas. For example, an interface corresponding to the email list item 309 sorted first may be displayed on the first split-screen display interface in the split-screen area (the interface may also be referred to as an interface corresponding to a first target function), an interface corresponding to the new email function item 310 sorted second is displayed on a second split-screen display interface in the split-screen area, an interface corresponding to an inbox function item 311 sorted third is displayed on the third split-screen display interface in the split-screen area, and a split-screen display order of the function is similar to this.

In a possible implementation, when the user disables the custom function split-screen sequence control 308 in the function split-screen setting interface shown in d in FIG. 3A and FIG. 3B, the terminal device may subsequently display interfaces of a plurality of functions of the user that have relatively high frequencies of using email in the plurality of split-screen areas, or the terminal device may display, in a plurality of split-screen areas, interfaces of functions memorized when the user recently performs split-screen displaying of the function of the email.

After the setting operation in FIG. 3A and FIG. 3B is performed, when a function of the application is subsequently displayed in a split-screen manner, the interface of the function set in FIG. 3A and FIG. 3B may be displayed in a split-screen area.

It may be understood that the terminal device may not provide the function setting interface shown in FIG. 3A and FIG. 3B, or it may be understood that the user may not set a function that specifically needs to be displayed. Subsequently, that the terminal device may display an interface of a second target function may include: displaying, in a plurality of split-screen areas, interfaces of a plurality of functions of the user that have relatively high frequencies of using email, or the terminal device may display, in a plurality of split-screen areas, interfaces of functions memorized when the user recently performs split-screen displaying of the function of the email. This embodiment of this application sets no specific limitation on a step of setting a function displayed in the split-screen.

In a step of specifically triggering a function of the application to perform split-screen displaying, the step may include a step of triggering the application to enter an active state, and a step of triggering specific split-screen displaying.

Figure 4:
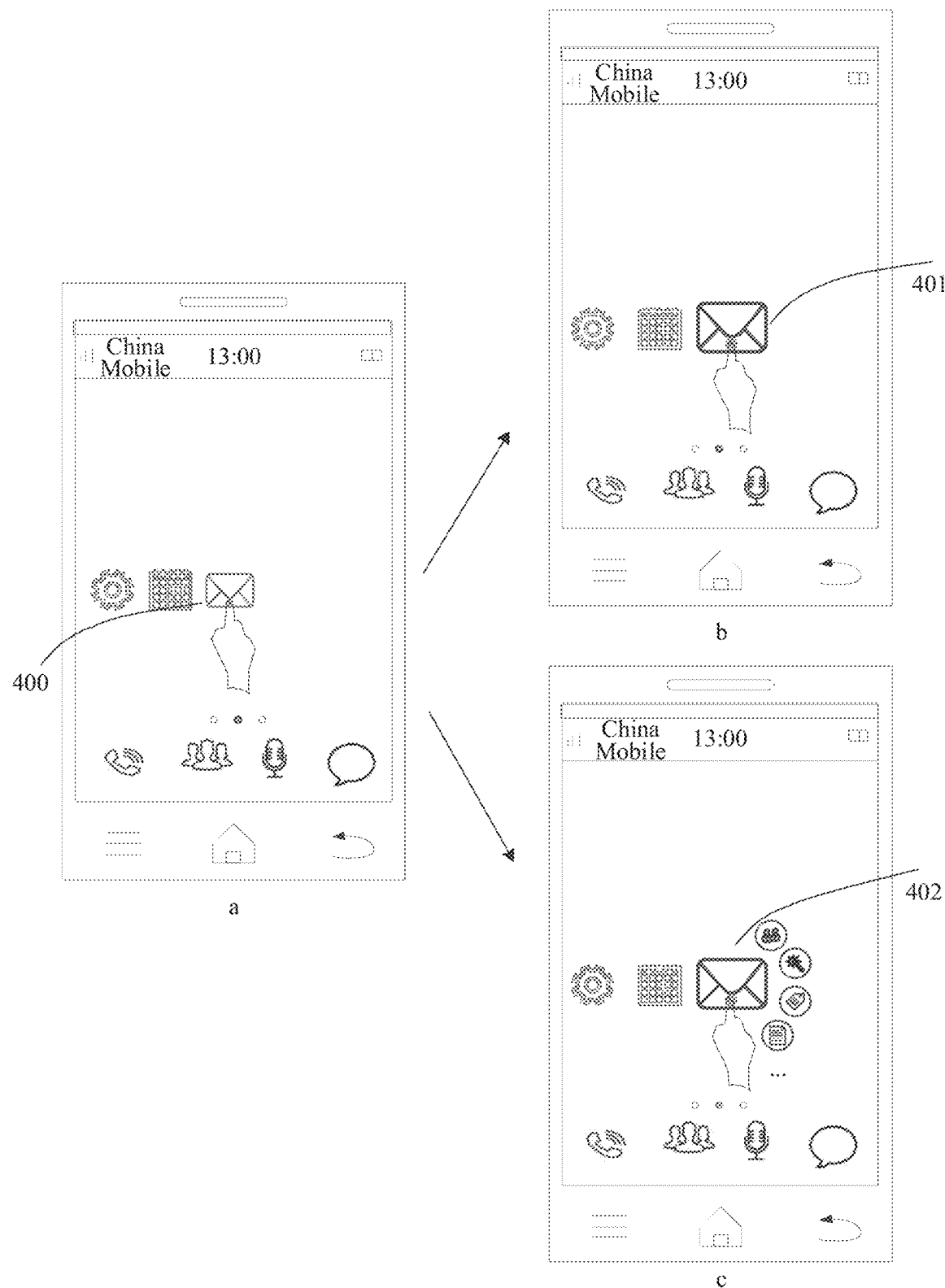
FIG. 4 is a schematic interface diagram of triggering an application to enter an active state according to an embodiment of this application.

For example, FIG. 4 is a schematic diagram of an interface of triggering an application to enter an active state.

As shown in a in FIG. 4, in a launcher state, a user triggers an email icon 400 by tapping, touching, or long pressing. A terminal device receives the operation of triggering the email icon 400 by the user, and may trigger the email 400 to be in an active state.

In a possible implementation, when the email enters the active state, the terminal device may display an interface shown in b in FIG. 4. For example, the email icon 401 in the active state shown in b in FIG. 4 may be an icon displayed on the launcher in a manner of floating, highlighting, or the like.

In a possible implementation, when the email enters the active state, the terminal device may display an interface shown in c in FIG. 4. For example, on the interface shown in c in FIG. 4, the terminal device displays the email icon 402 displayed in a manner of floating, highlighting, or the like, and displays icons of a plurality of function items of the email around the email icon.

After the email enters the active state, the user may continue to trigger the email icon 401 (or 402) in the active state, so as to implement a specific process of triggering split-screen displaying of a function.

Figure 14:
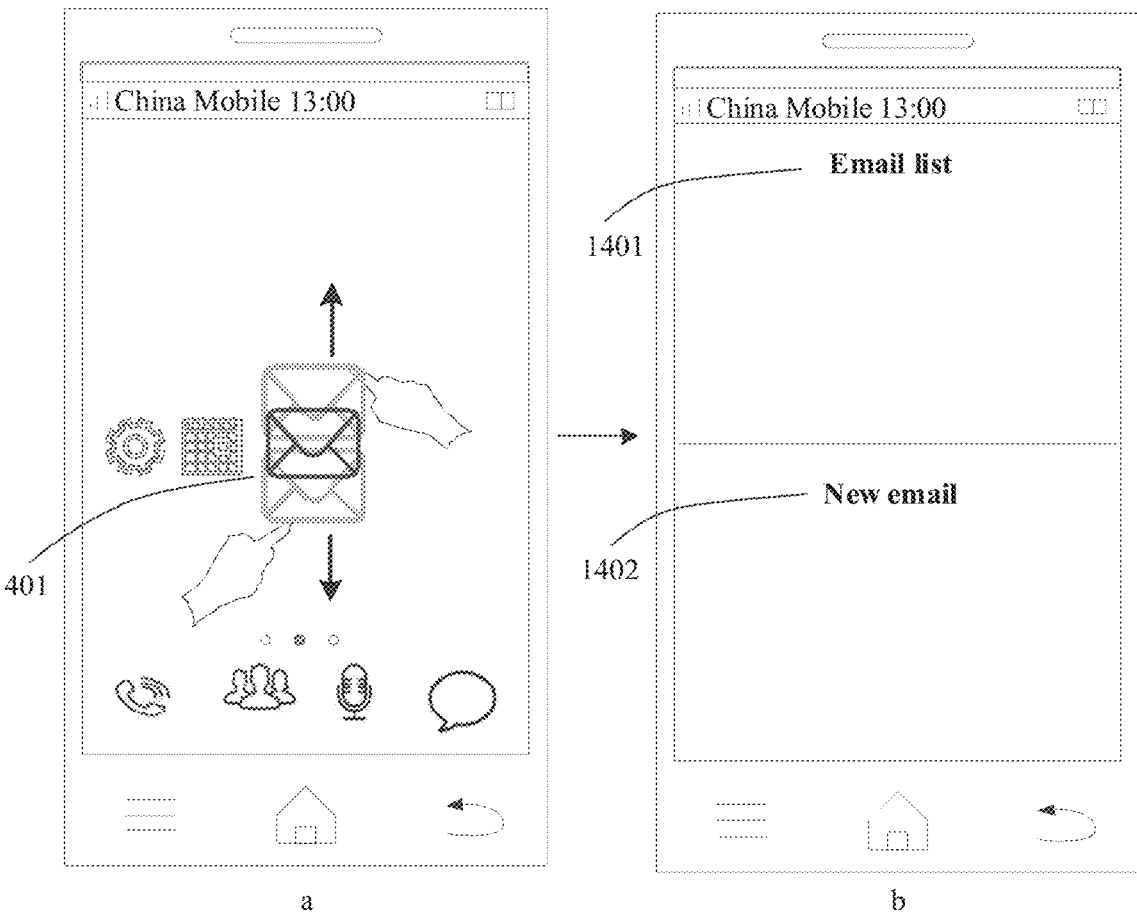
FIG. 14 is a schematic interface diagram of triggering split-screen displaying of a function based on a slide operation according to an embodiment of this application.
Figure 15:
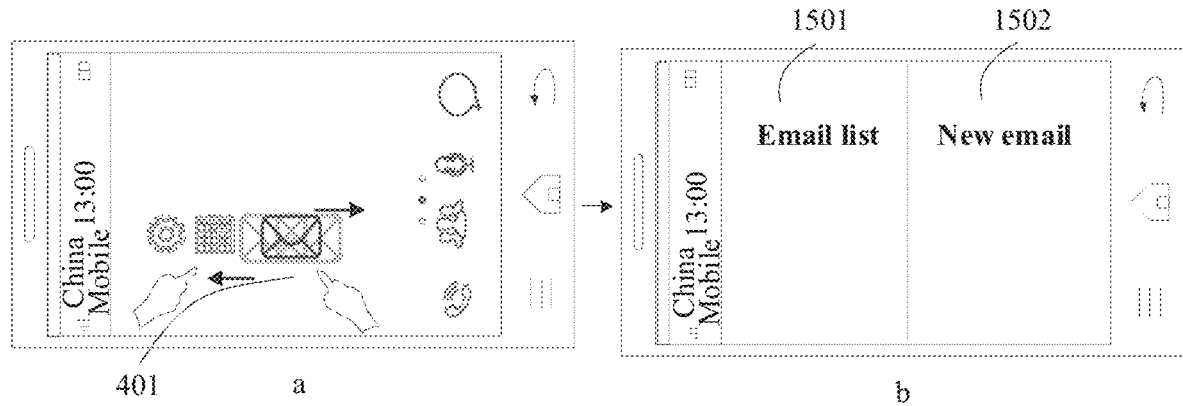
FIG. 15 is another schematic interface diagram of triggering split-screen displaying of a function based on a slide operation according to an embodiment of this application.
Figure 16:
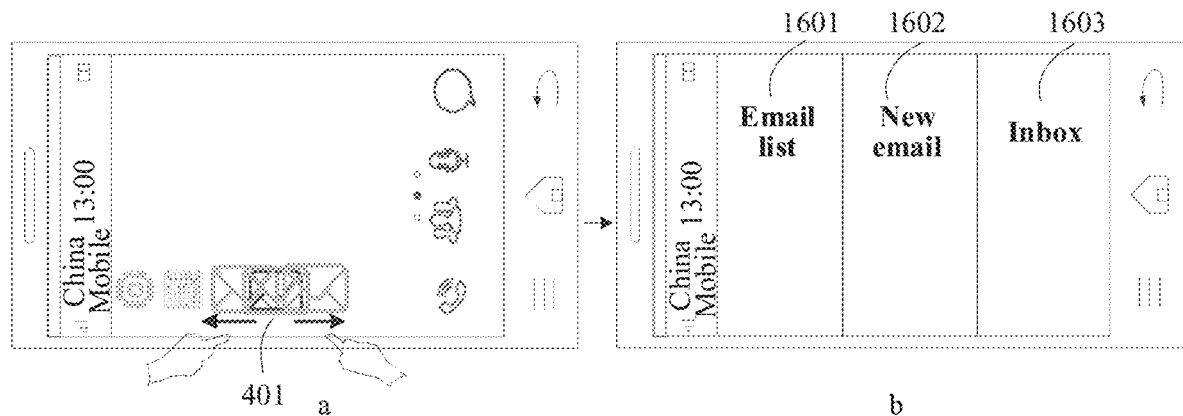
FIG. 16 is a schematic interface diagram of triggering three-screen display of a function based on a slide operation according to an embodiment of this application.

For example, on the basis of FIG. 4, FIG. 5 to FIG. 16 are specific processes of triggering split-screen displaying of a function. FIG. 5 to FIG. 13 are examples in which a second operation includes a continuous touch operation and a plurality of drag operations to describe a process of triggering split-screen displaying of a function. FIG. 14 to FIG. 16 are examples in which the second operation includes slide operations in different directions to describe a process of triggering split-screen displaying of a function.

Figure 5:
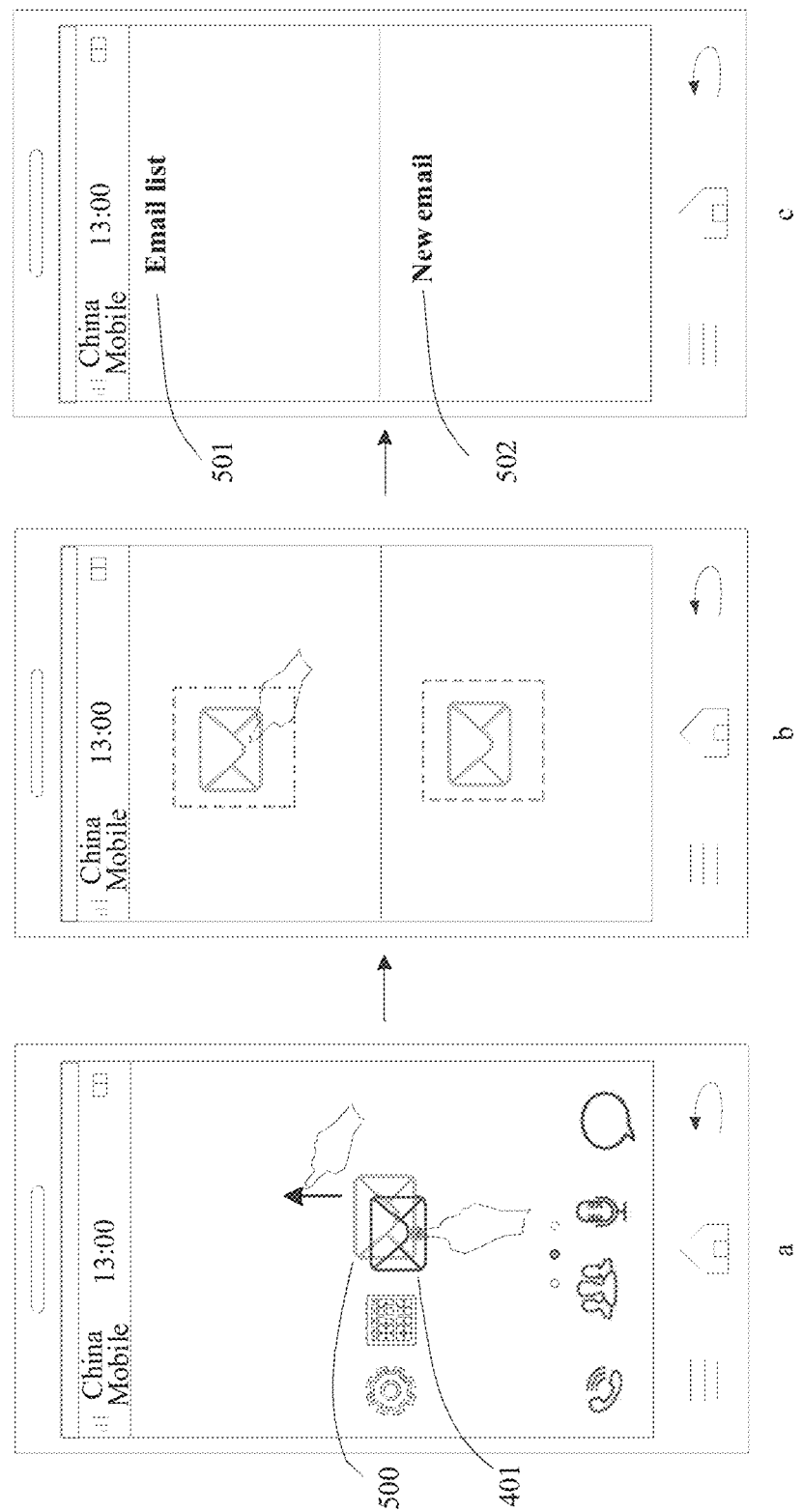
FIG. 5 is a schematic interface diagram of triggering split-screen displaying of a function based on a drag operation according to an embodiment of this application.
Figure 6:
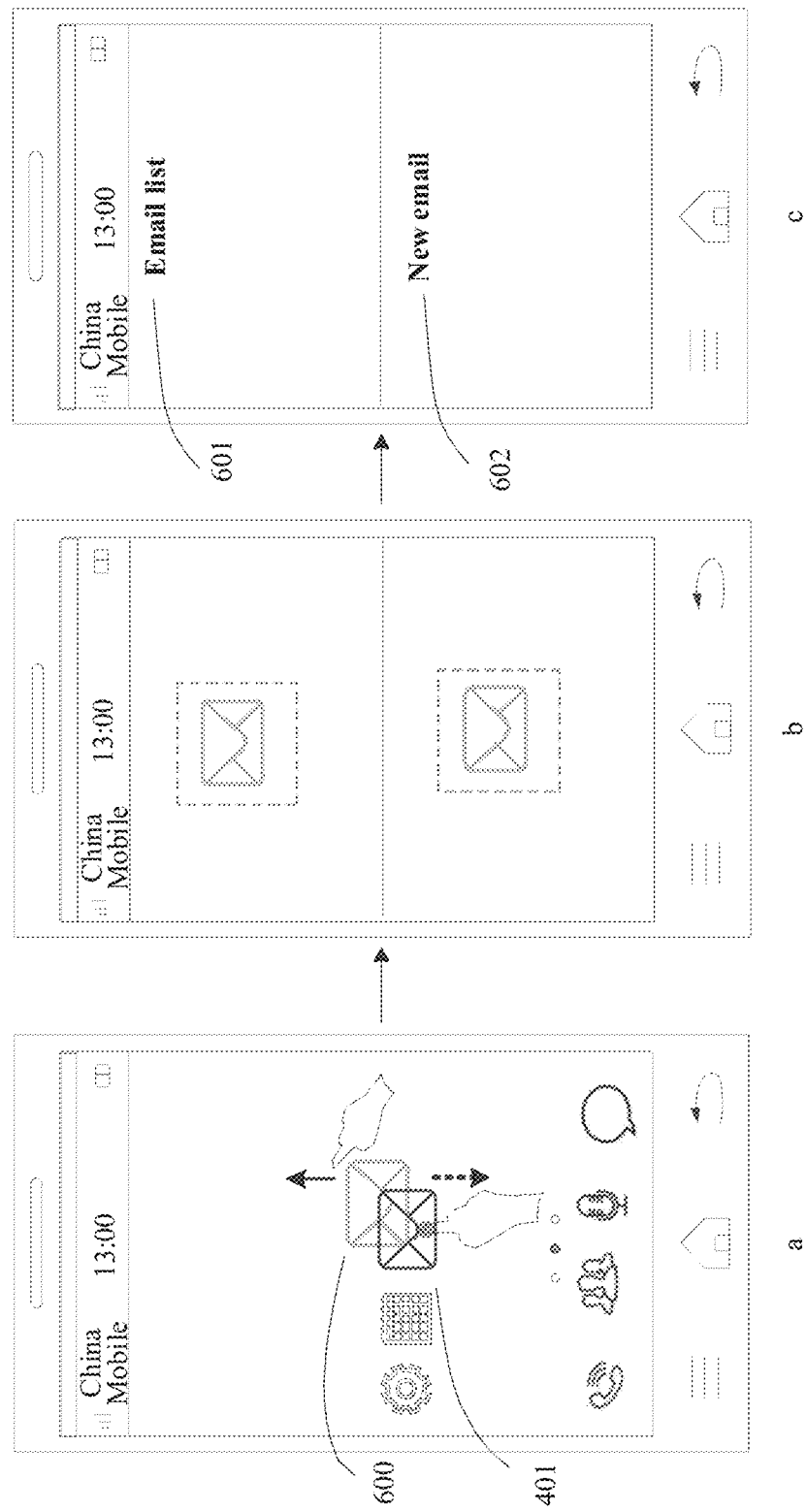
FIG. 6 is another schematic interface diagram of triggering split-screen displaying of a function based on a drag operation according to an embodiment of this application.
Figure 7:
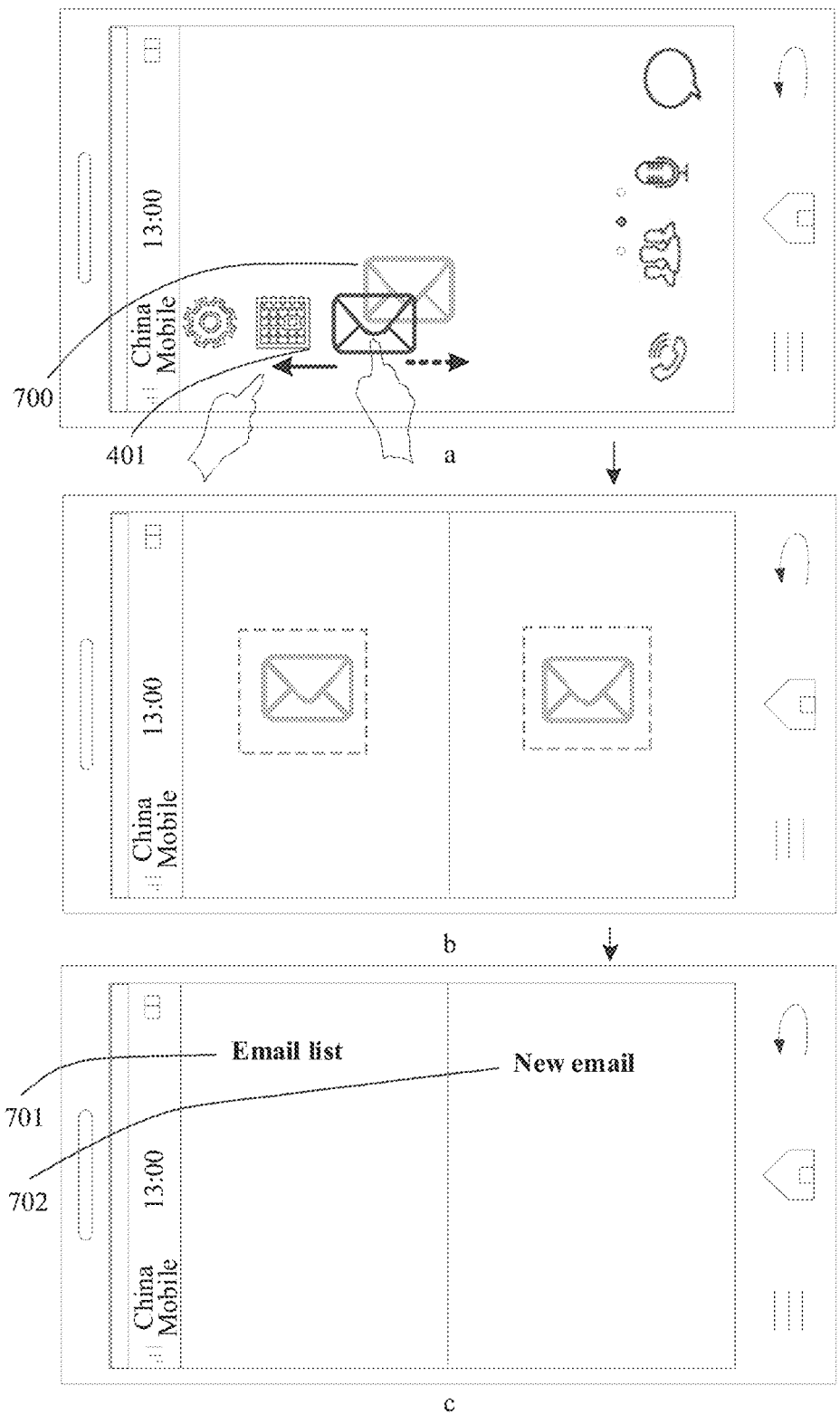
FIG. 7 is still another schematic interface diagram of triggering split-screen displaying of a function based on a drag operation according to an embodiment of this application.
Figure 8:
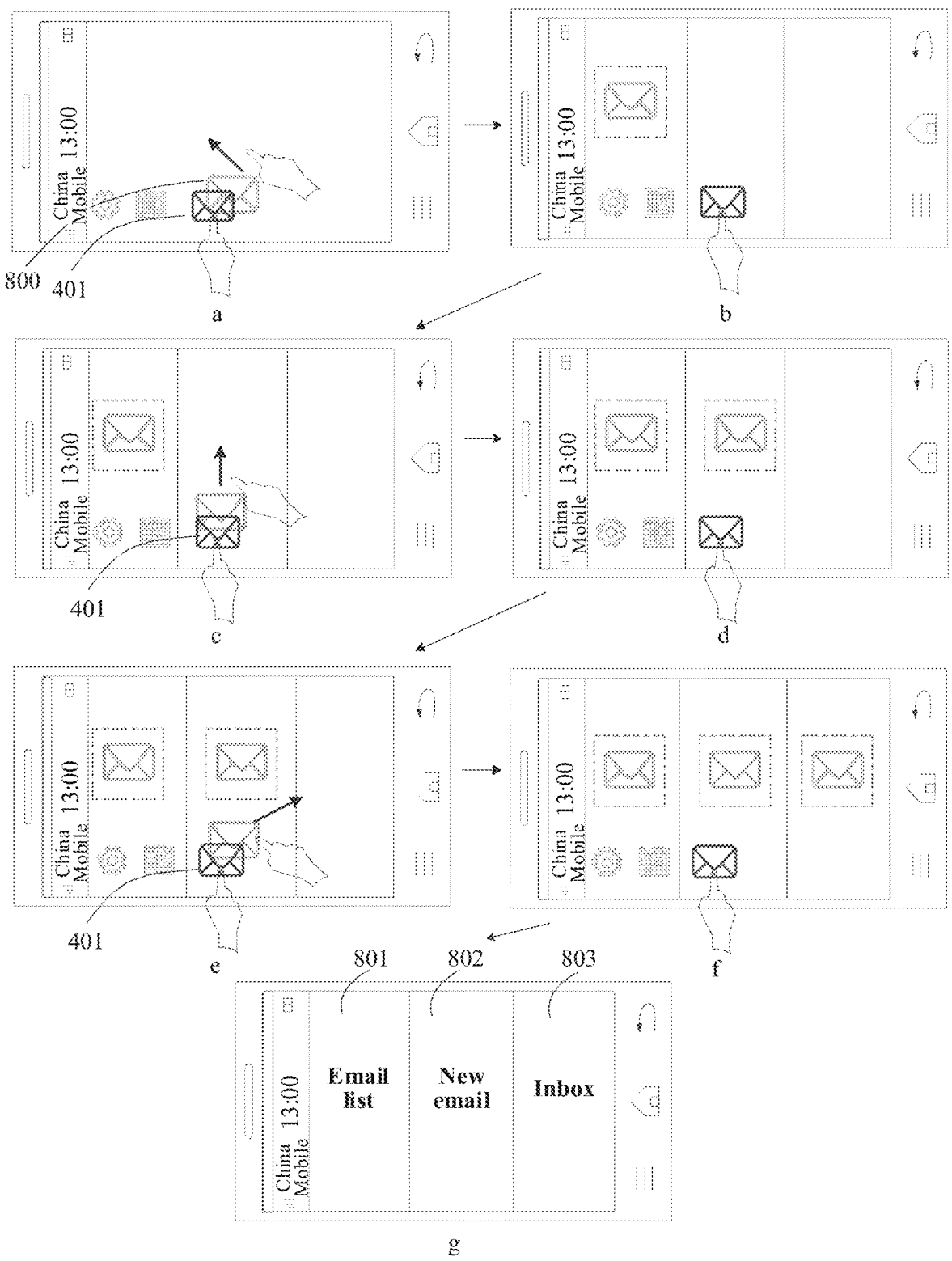
FIG. 8 is a schematic interface diagram of triggering three-screen display of a function based on a drag operation according to an embodiment of this application.
Figure 9:
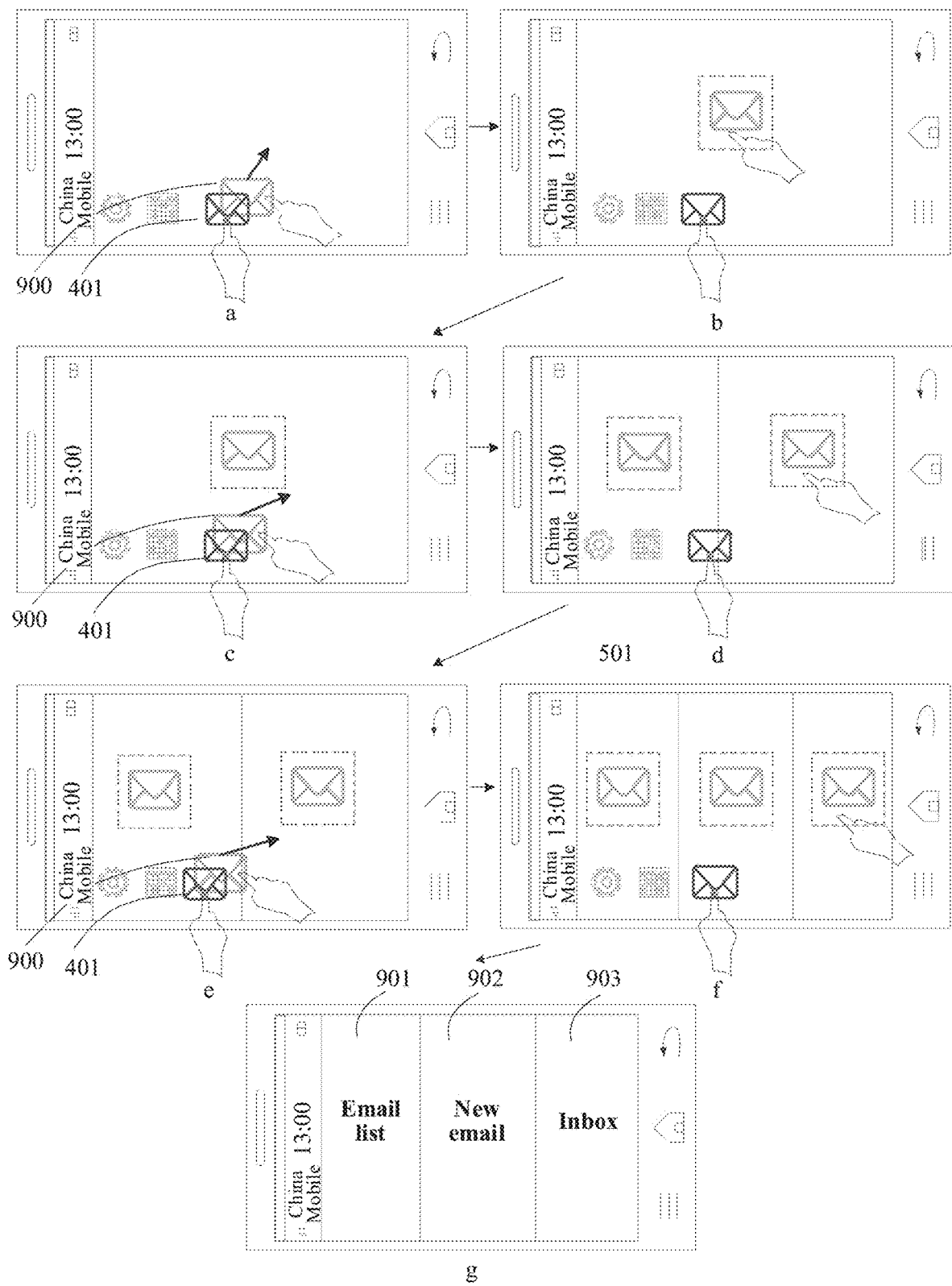
FIG. 9 is another schematic interface diagram of triggering three-screen display of a function based on a drag operation according to an embodiment of this application.
Figure 10:
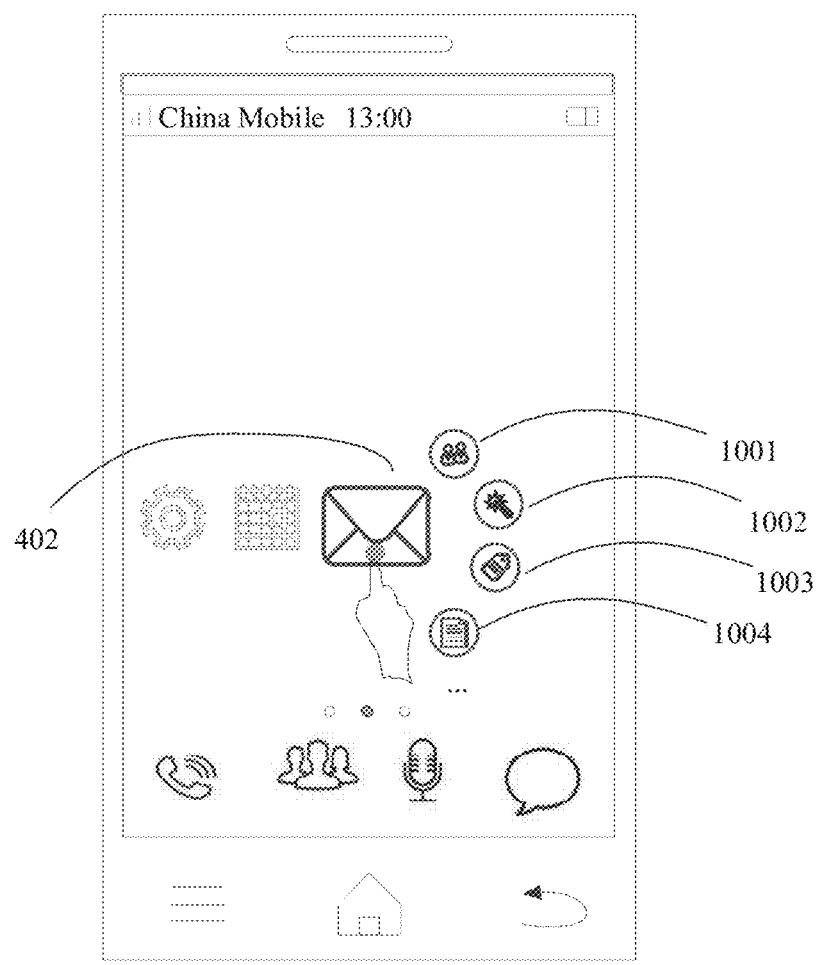
FIG. 10 is a schematic interface diagram of triggering display of a function item of an application according to an embodiment of this application.
Figure 11:
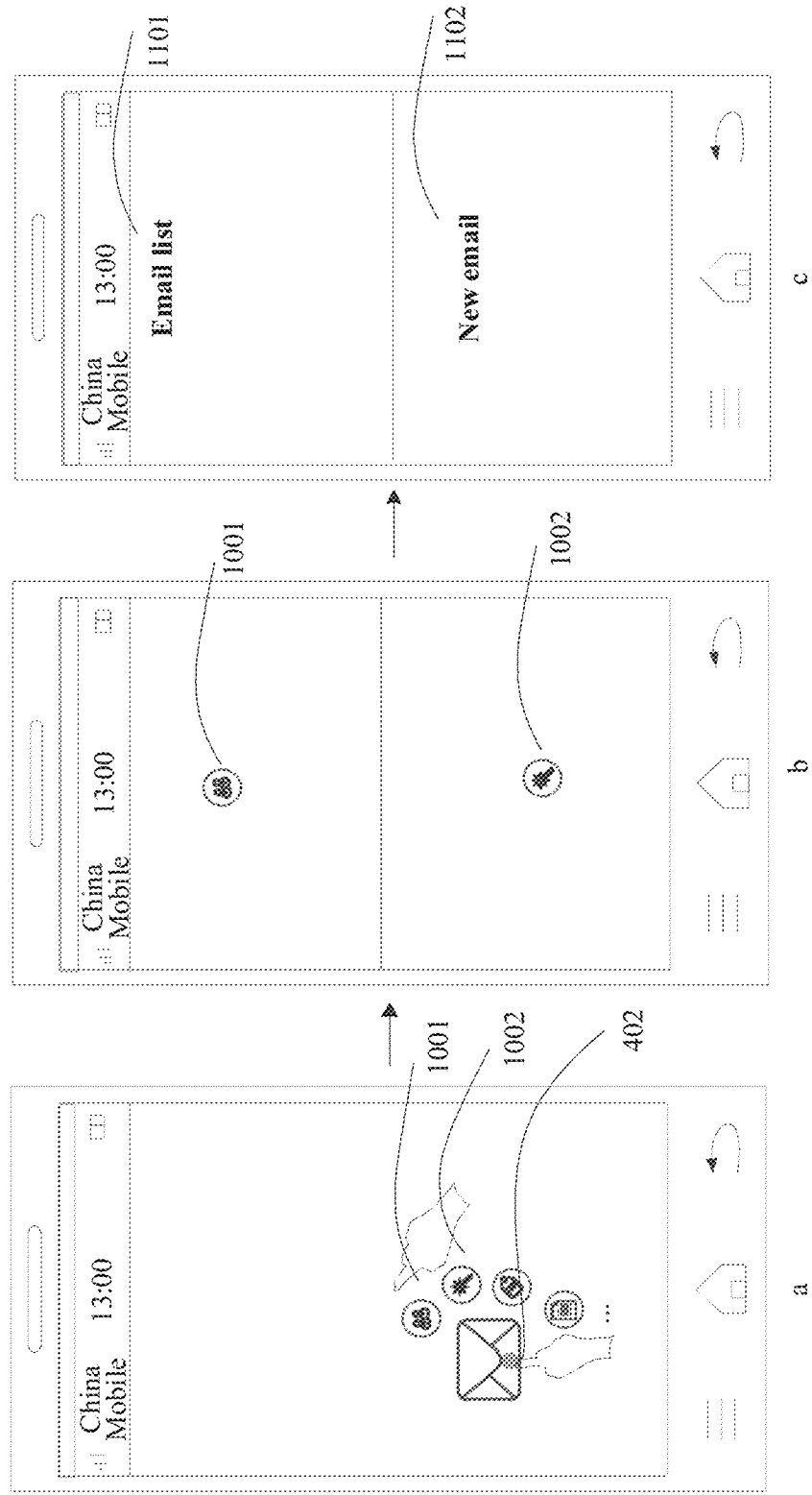
FIG. 11 is a schematic interface diagram of triggering split-screen displaying of a function based on a drag function item according to an embodiment of this application.
Figure 12:
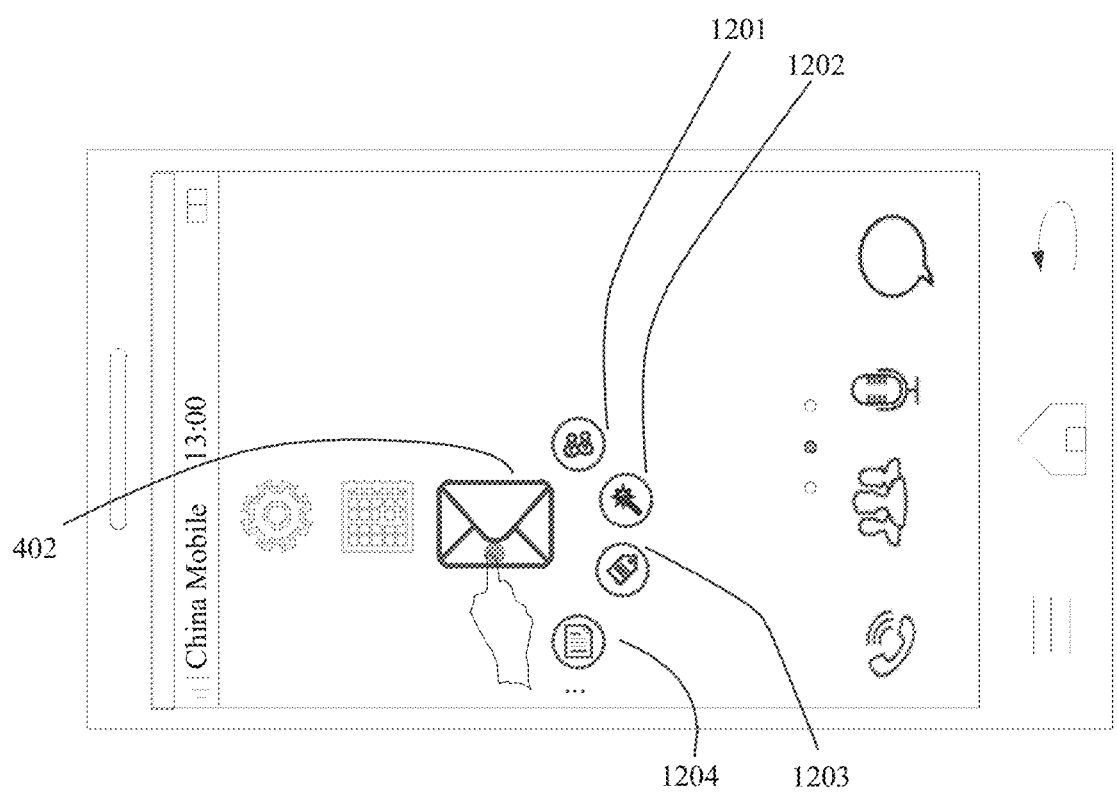
FIG. 12 is another schematic interface diagram of triggering display of a function item of an application according to an embodiment of this application.
Figure 13:
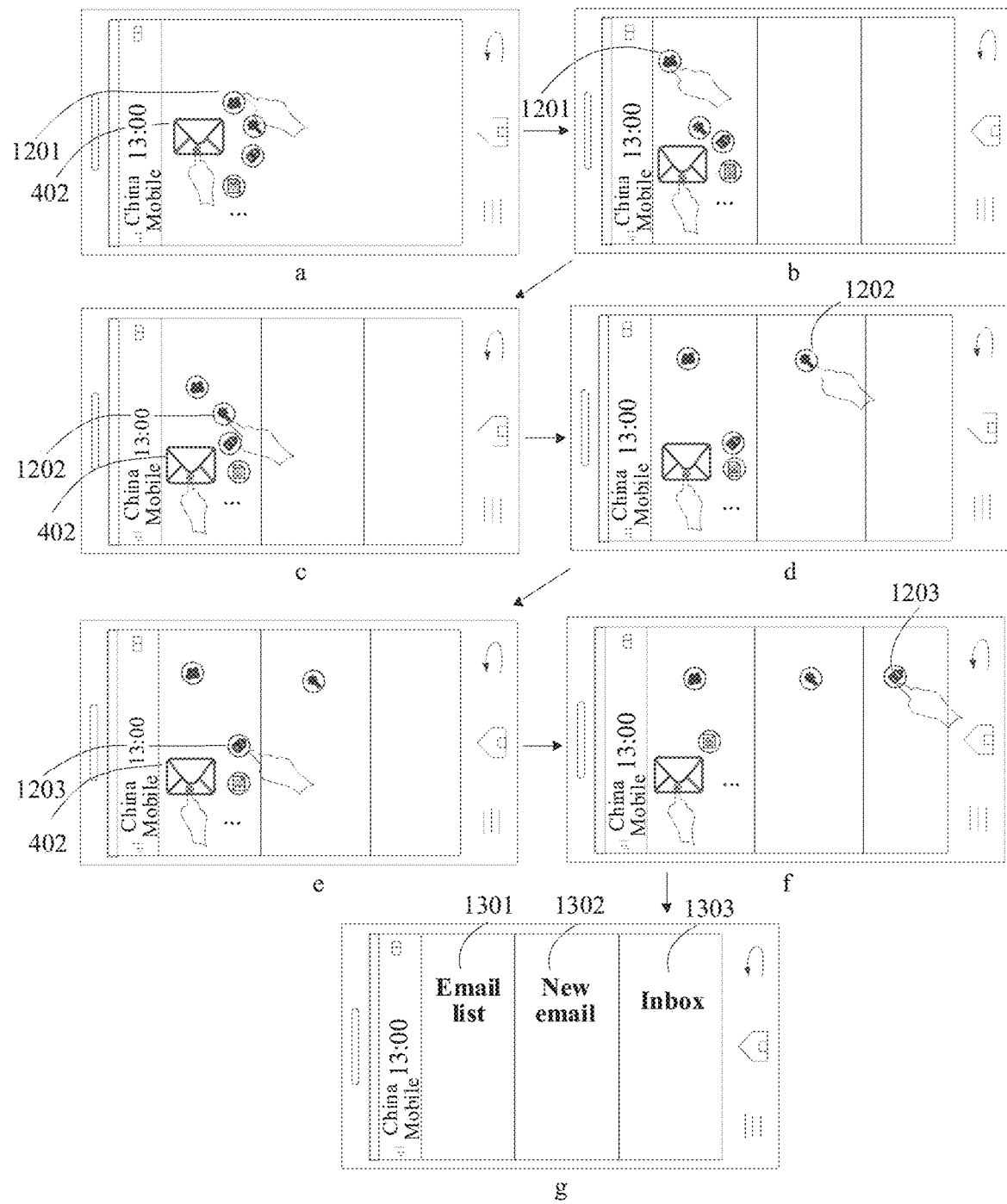
FIG. 13 is a schematic interface diagram of triggering three-screen display of a function based on a drag function item according to an embodiment of this application.

In FIG. 5 to FIG. 13, FIG. 5 to FIG. 9 are processes of triggering split-screen displaying of a function by performing an operation of dragging an application icon in an active state. FIG. 5 to FIG. 7 are processes of triggering split-screen displaying of a function by performing an operation of dragging an application icon in an active state when a quantity of split-screen areas of a terminal device is 2. FIG. 8 and FIG. 9 are processes of triggering split-screen displaying of a function by performing an operation of dragging an application icon in an active state when a quantity of split-screen areas of a terminal device is 3. FIG. 10 to FIG. 13 are processes of triggering split-screen displaying of a function by performing an operation of dragging a function item icon of an application in an active state. FIG. 10 and FIG. 11 are processes of triggering split-screen displaying of a function by performing an operation of dragging a function item icon of an application in an active state when a quantity of split-screen areas of a terminal device is 2. FIG. 12 and FIG. 13 are processes of triggering split-screen displaying of a function by performing an operation of dragging a function item icon of an application in an active state when a quantity of split-screen areas of a terminal device is 3.

FIG. 14 to FIG. 16 are processes of triggering split-screen displaying of a function by performing an operation of sliding an application icon in an active state in two different directions. FIG. 14 and FIG. 15 are processes of triggering split-screen displaying of a function by performing an operation of sliding an application icon in an active state when a quantity of split-screen areas of a terminal device is 2. FIG. 16 is a process of triggering split-screen displaying of a function by performing an operation of sliding an application icon in an active state when a quantity of split-screen areas of a terminal device is 3.

A possible implementation in which the user slides in two different directions includes: The user simultaneously performs two slide operations in opposite directions on an application in an active state. For example, the user may perform slide operations in other directions by using two fingers such as sliding up and down at the same time, or sliding left and right at the same time.

For example, FIG. 5 is a schematic diagram of an interface of triggering split-screen displaying of a function based on a drag operation.

As shown in FIG. 5, the drag operation may be an operation of triggering split-screen displaying of a function by a drag end position of a user, or may be understood as that the user needs to drag an icon to a position in a split-screen area in the drag operation.

On the basis of FIG. 4, when the user continuously touches and drags for a plurality of times an email icon 401 in an active state on an interface shown in a in FIG. 5, a terminal device displays, in one split-screen area, an interface corresponding to one function of the application for one drag operation.

For example, the user may continuously touch (for example, continuously press) the email icon 401 in the active state by one hand on the interface shown in a in FIG. 5, and perform the first drag operation on the email icon 401 in the active state by the other hand. In a process in which the drag operation continues, a duplicated icon 500 of the email may be displayed, and the terminal device is triggered to display an interface of a split-screen grid of upper and lower split-screens shown in b in FIG. 5. The user may continue to perform the drag operation until a position at which the drag operation ends is in a split-screen area of the split-screen grid, and the user may end the first drag operation. The terminal device may display an interface corresponding to a function of the email in a split-screen area corresponding to the drag end position of the user.

The user continuously touches (for example, continuously presses) the email icon 401 in the active state by one hand on the interface shown in a in FIG. 5, and performs the second drag operation on the email icon 401 in the active state by the other hand. An operation process of the terminal device in response to the second drag to the end position by the user is the same as that of the first drag operation. In this case, the terminal device may display an interface corresponding to a function of the email in the other split-screen area corresponding to the drag end position of the user.

In this case, the interfaces corresponding to the functions of the email are displayed in the two split-screen areas of the terminal device, as shown in c in FIG. 5. The interfaces corresponding to the functions of the email may include an email list interface 501 and a new email interface 502.

In a possible understanding manner, the split-screen grid responds to a continuous drag operation performed by the user on the application in the active state, and the terminal device displays a plurality of lines that divide a display screen into several split-screen areas whose interface sizes are equal or different, and a graph enclosed by the lines used to divide different split-screen areas and the display screen is referred to as a split-screen grid. In this embodiment of this application, a size of an interface obtained by dividing a split-screen grid is not limited.

For example, FIG. 6 is a schematic diagram of another interface of triggering split-screen displaying of a function based on a drag operation.

As shown in FIG. 6, the drag operation may be an operation of triggering split-screen displaying of a function by a user's drag pointing direction. For example, in a drag operation, when the user's drag pointing direction is upward (or downward), the terminal device identifies a drag operation in which the user's drag direction is an upward (or a downward) direction, the terminal device may display, in response to the drag operation in which the drag direction is upward (or downward), a split-screen grid of upper and lower split-screens. The user ends the drag operation, and the terminal device automatically identifies a split-screen area corresponding to the drag operation in the upward (or downward) direction, and displays, in a split-screen area, an interface corresponding to a function of the application.

In a possible understanding manner, in an implementation of FIG. 6, the drag operation may be that the user does not need to drag the active application into the split-screen area, but performs a drag action of the application in any direction, and the terminal device automatically identifies, in response to the drag action in the user's pointing direction, the split-screen area in which the application icon enters in the split-screen grid.

For example, the user may continuously touch (for example, continuously press) the email icon 401 in the active state by one hand on an interface shown in a in FIG. 6, and at the same time, perform a drag action in an upward pointing direction (or downward direction) on the email icon 401 in the active state by the other hand. The terminal device displays a duplicated icon 600 of the email and a split-screen grid triggered by a drag operation in an upward pointing direction (or downward direction), and the split-screen grid divides the display screen into two split-screen areas, namely, upper and lower split-screens shown in b in FIG. 6.

The user may end the drag operation by releasing the email icon 401 in the active state. The terminal device automatically identifies that the email icon enters the upward (or downward) split-screen area in the split-screen grid, and the terminal device displays an interface corresponding to a function of the email in the split-screen area whose pointing direction is upward (or downward).

The user may continue to continuously touch (for example, continuously press) the email icon 401 in the active state by one hand on the interface shown in a in FIG. 6, and at the same time, perform the second drag action in the downward pointing (or upward) direction on the email icon 401 in the active state by the other hand. A process in which the terminal device responds to the second drag operation of the user is the same as that of the first drag operation. The terminal device automatically identifies that the email icon enters the downward (or upward) split-screen area in the split-screen grid, and the terminal device may display an interface corresponding to a function of the email in the split-screen area in the downward pointing (or upward) direction, such as an interface shown in b in FIG. 6.

In a possible understanding manner, the terminal device responds to the operation of dragging the application in the active state for a plurality of times. When a drag operation ends, the terminal device may display an interface corresponding to a function in a split-screen area.

In this case, the interfaces corresponding to the functions of the email in the split-screen areas in the upward pointing (or downward) direction are displayed in the two split-screen areas, namely, upper and lower split-screens, of the terminal device, as shown in c in FIG. 6. The interfaces corresponding to the functions of the email may include an email list interface 601 and a new email interface 602.

In a possible implementation, for the operation of dragging the application in the active state, when a pressing force of the user drag operation is greater than a pressing threshold for triggering the application to execute the drag action in the drag pointing direction, the terminal device identifies that the user drag operation is valid, and displays a duplicated icon and a split-screen grid of the application. Subsequently, the terminal device responds to the user drag operation, and a process of displaying the interface of split-screen displaying of the function of the application by the terminal device is the same as a displaying process of triggering the interface of the terminal device by using the foregoing drag operation. Details are not described herein again.

In a possible implementation, when the pressing force of the user drag operation is less than or equal to the pressing threshold for triggering the application to execute the drag action in the drag pointing direction, the terminal device identifies that the user drag operation is invalid, and does not respond to the user drag operation.

For example, FIG. 7 is a schematic diagram of still another interface of triggering split-screen displaying of a function based on a drag operation.

A difference between FIG. 7 and FIG. 6 is that FIG. 7 is an example in which a left (or right) direction of a user's drag pointing direction is used to trigger left and right split-screens of a terminal device, and FIG. 6 is an example in which an upward (or downward) direction of a user's drag pointing direction is used to trigger upper and lower split-screens of a terminal device.

For example, the user may continuously touch (for example, continuously press) the email icon 401 in the active state by one hand on an interface shown in a in FIG. 7, and at the same time, perform a drag action in a leftward pointing direction (or rightward direction) on the email icon 401 in the active state by the other hand. The terminal device displays a duplicated icon 700 of the email and a split-screen grid triggered by a drag operation in a leftward pointing direction (or rightward direction), and the split-screen grid divides the display screen into two split-screen areas, namely, left and right split-screens shown in b in FIG. 7.

The user may end the drag operation by releasing the email icon 401 in the active state. The terminal device automatically identifies that the email icon enters the left (or right) split-screen area in the split-screen grid, and the terminal device displays an interface corresponding to a function of the email in the split-screen area whose pointing direction is leftward (or rightward).

The user may continue to continuously touch (for example, continuously press) the email icon 401 in the active state by one hand on the interface shown in a in FIG. 7, and at the same time, perform the second drag action in the rightward pointing (or leftward) direction on the email icon 401 in the active state by the other hand. A process in which the terminal device responds to the second drag operation of the user is the same as that of the first drag operation. The terminal device automatically identifies that the email icon enters the right (or left) split-screen area in the split-screen grid, and the terminal device may display an interface corresponding to a function of the email in the split-screen area in the rightward pointing (or leftward) direction.

In this case, the interfaces corresponding to the functions of the email in the split-screen areas in the leftward pointing (or rightward) direction are displayed in the two split-screen areas, namely, left and right split-screens, of the terminal device, as shown in c in FIG. 7. The interfaces corresponding to the functions of the email may include an email list interface 701 and a new email interface 702.

FIG. 8 and FIG. 9 are processes of triggering split-screen displaying of a function by performing an operation of dragging an application icon in an active state when a quantity of split-screen areas of a terminal device is 3.

For example, FIG. 8 is a schematic diagram of an interface of triggering three-screen display of a function based on a drag operation.

A drag operation may be an operation of triggering split-screen displaying of a function according to a drag end position of the user, or may be an operation of triggering split-screen displaying of a function by the user by performing a drag action on the application in any pointing direction instead of dragging the active application to a split-screen area.

In this embodiment, that the quantity of split-screen areas of the terminal device is 3 is used as an example to describe a drag operation in which the user performs a drag action on the application in any pointing direction.

The user may continuously touch (for example, continuously press) the email icon 401 in the active state by one hand on an interface shown in a in FIG. 8, and at the same time, perform the first drag action in an upper left pointing direction on the email icon 401 in the active state by the other hand. The terminal device displays a duplicated icon 800 of the email, identifies the drag operation in which the user drag direction is the upper left pointing direction, and triggers a split-screen grid of left and right split-screens, and the split-screen grid divides the display screen into three left and right split-screen areas shown in b in FIG. 8.

The user may end the drag operation by releasing the email icon 401 in the active state. The terminal device automatically identifies that the email icon enters the leftmost split-screen area in the split-screen grid as shown in b in FIG. 8, and the terminal device displays an interface corresponding to a function of the email in the split-screen area whose pointing direction is the upper left direction.

The user continues to continuously touch (for example, continuously press) the email icon 401 in the active state by one hand on the interface shown in c in FIG. 8, and at the same time, performs the second drag action in the upward pointing direction on the email icon 401 in the active state by the other hand. A process in which the terminal device responds to the second drag operation of the user is the same as that of the first drag operation. The terminal device automatically identifies that the email icon enters the middle split-screen area in the split-screen grid shown in d in FIG. 8, and the terminal device may display an interface corresponding to a function of the email in the split-screen area in the upward pointing direction.

The user continues to continuously touch (for example, continuously press) the email icon 401 in the active state by one hand on the interface shown in e in FIG. 8, and at the same time, perform the third drag action in the upper right pointing direction on the email icon 401 in the active state by the other hand. A process in which the terminal device responds to the third drag operation of the user is the same as that of the first drag operation. The terminal device automatically identifies that the email icon enters the rightmost split-screen area in the split-screen grid shown in f in FIG. 8, and the terminal device may display an interface corresponding to a function of the email in the split-screen area in the upper right pointing direction.

In this case, the interfaces corresponding to the functions of the email in the three left and right split-screen areas of the terminal device are displayed, such as an interface shown in g in FIG. 8. The interfaces corresponding to the functions of the email may include an email list interface 801, a new email interface 802, and an inbox interface 803.

For example. FIG. 9 is a schematic diagram of another interface of triggering three-screen display of a function based on a drag operation.

In a possible implementation, a user may successively drag an application in an active state, and a terminal device displays, in response to a plurality of drag operations of the user, split-screen display interfaces of functions of the application corresponding to a quantity of drag operations of the user. It may be understood that, a quantity of split-screen areas displayed by the terminal device is related to the quantity of drag operations of the user. For example, if an application in an active state is dragged once, the terminal device displays one split-screen area of a function of the application. If the application in the active state is dragged twice, the terminal device displays two split-screen areas of the function of the application. If the application in the active state is dragged three times, the terminal device displays three split-screen areas of the function of the application.

A drag operation may be an operation of triggering split-screen displaying of a function according to a drag end position of the user, or may be an operation of triggering split-screen displaying of a function by the user by performing a drag action on the application in any pointing direction instead of dragging the active application to a split-screen area.

In this embodiment, that the quantity of split-screen areas of the terminal device is 3 is used as an example, to describe a drag operation of triggering split-screen displaying of a function by a drag end position of the user.

For example, the user may continuously touch (for example, continuously press) the email icon 401 in the active state by one hand on the interface shown in a in FIG. 9, and perform the first drag operation on the email icon 401 in the active state by the other hand. In a process in which the drag operation continues, a duplicated icon 900 of the email may be displayed, and the terminal device is triggered to display one split-screen area shown in b in FIG. 9. The user may continue to perform the drag operation until a position at which the drag operation ends is in a split-screen area, and the user may end the first drag operation.

The user continuously touches (for example, continuously presses) the email icon 401 in the active state by one hand on the interface shown in c in FIG. 9, and perform the second drag operation on the email icon 401 in the active state by the other hand. In a process in which the drag operation continues, a duplicated icon 900 of the email may be displayed, and in response to a drag end position of the user, the terminal device is triggered to display two split-screen areas divided by a split-screen grid shown in d in FIG. 9. The user may continue to perform the drag operation until a position at which the drag operation ends is in a split-screen area, and the user may end the second drag operation.

The user continuously touches (for example, continuously presses) the email icon 401 in the active state by one hand on the interface shown in e in FIG. 9, and perform the third drag operation on the email icon 401 in the active state by the other hand. In a process in which the drag operation continues, a duplicated icon 900 of the email may be displayed, and in response to a drag end position of the user, the terminal device is triggered to display three split-screen areas of a split-screen grid shown in fin FIG. 9. The user may continue to perform the drag operation until a position at which the drag operation ends is in a split-screen area, and the user may end the third drag operation.

In this case, the terminal device may display interfaces corresponding to three functions of the email in the three split-screen areas corresponding to the drag end position. The interfaces corresponding to the functions of the email may include an email list interface 901, a new email interface 902, and an inbox interface 903.

Similarly, in FIG. 8 and FIG. 9, the method for triggering split-screen displaying of a function by performing an operation of dragging an application in an active state may also be applied to a multi-screen interface, and a drag and trigger manner is the same. Details are not described in this embodiment.

FIG. 10 to FIG. 13 are processes of triggering split-screen displaying of a function by performing an operation of dragging a function item of an application in an active state.

FIG. 10 and FIG. 11 are processes of triggering split-screen displaying of a function by dragging a function item of an application in an active state when a quantity of split-screen areas of a terminal device is 2.

For example, FIG. 10 is a schematic diagram of an interface of triggering displaying of a function item of an application.

For example, a user may continuously touch (for example, continuously press) an email icon on an interface shown in FIG. 10 by one hand. A terminal device may display, in response to the continuous touch operation performed by the user, a plurality of function item icons of the email around an email icon 402 in the active state. For example, the function item icons of the email may include one or more of the following: an email list icon 1001, a new email icon 1002, an inbox icon 1003, a draft icon 1004, or another function item icon of the email.

For example, FIG. 11 is a schematic diagram of an interface of triggering split-screen displaying of a function based on an operation of dragging a function item.

The user may trigger, by using an operation such as tapping, touching, or sliding, an application to enter an active state, and display icons of a plurality of function items of the application around the application icon. The user may continue to perform a drag operation on the function item icon of the application in the active state. In response to the drag operation of dragging the function item of the user, the terminal device displays, in a split-screen area, a function interface corresponding to the dragged function item.

A drag operation may be an operation of triggering split-screen displaying of a function by dragging a function item to an end position by the user, or may be an operation of triggering split-screen displaying of a function by the user by performing a drag action on the function item of the application in any pointing direction instead of dragging the function item of the active application to a split-screen area.

In this embodiment, the operation of triggering split-screen displaying of a function by dragging a function item to an end position by the user is described.

For example, on an interface shown in a in FIG. 11, when a user keeps continuously touching an email icon 402 in an active state, the user may perform the first drag operation on an email list icon 1001. The drag operation triggers a terminal device to display an interface of a split-screen grid shown in b in FIG. 11, and the user may continue to perform the drag operation until an end position of the drag operation is in a split-screen area of the split-screen grid, and the user may end the first drag operation.

The user may continue to touch (for example, continuously press) the email icon 402 in the active state on the interface shown in a in FIG. 11 by one hand, and at the same time, the user performs a drag operation on the new email icon 1002 by the other hand, until an end position of the drag operation is located in the other split-screen area of the split-screen grid, and the user may end the second drag operation.

In this case, the terminal device may display interfaces corresponding to functions of the email in the split-screen areas corresponding to the drag end position, as shown in c in FIG. 11. The interfaces corresponding to the functions of the email may include an email list interface 1101 and a new email interface 1102.

FIG. 12 and FIG. 13 are processes of triggering split-screen displaying of a function by performing an operation of dragging a function item of an application when a quantity of split-screen areas of a terminal device is 3. In this embodiment, a drag operation of trigging three-split-screen displaying of a function by dragging a function item to an end position by a user is described.

For example, FIG. 12 is a schematic diagram of another interface of triggering displaying of a function item of an application.

For example, a user may continuously touch (for example, continuously press) an email icon 402 in an active state on an interface shown in FIG. 12 by one hand. A terminal device may display, in response to the continuous touch operation performed by the user, a plurality of function items of the email around the email icon 402 in the active state. For example, the function items may include one or more of the following: an email list icon 1201, a new email icon 1202, an inbox icon 1203, a draft icon 1204, or another function item of the email.

For example, FIG. 13 is a schematic diagram of an interface of triggering three-screen display of a function based on an operation of dragging a function item.

For example, on an interface shown in a in FIG. 13, when a user may keep continuously touching an email icon 402 in an active state by one hand, the user may perform the first drag operation on an email list icon 1201 by the other hand. The drag operation triggers a terminal device to display an interface of a split-screen grid of three split-screens shown in b in FIG. 13, and the user may continue to perform the drag operation until an end position of the drag operation is in a split-screen area of the split-screen grid shown on an interface in b in FIG. 13, and the user may end the first drag operation.

The user may continue to touch (for example, continuously press) the email icon 402 in the active state on an interface shown in c in FIG. 13 by one hand, and at the same time, the user performs a drag operation on the new email icon 1202 by the other hand, until an end position of the drag operation is located in another split-screen area of the split-screen grid shown on an interface in d in FIG. 13, and the user may end the second drag operation.

The user may continue to touch (for example, continuously press) the email icon 402 in the active state on an interface shown in e in FIG. 13 by one hand, and at the same time, the user performs a drag operation on the inbox icon 1203 by the other hand, until an end position of the drag operation is located in another split-screen area of the split-screen grid shown in f in FIG. 13, and the user may end the third drag operation.

In this case, the terminal device may display interfaces corresponding to functions of the email in the split-screen areas corresponding to the drag end position, as shown in g in FIG. 13. The interfaces corresponding to the functions of the email may include an email list interface 1301, a new email interface 1302, and an inbox interface 1303.

Similarly, in FIG. 13, the method for triggering split-screen displaying of a function by performing an operation of dragging a function item of an application in an active state may also be applied to a multi-screen interface, and a drag and trigger manner is the same. Details are not described in this embodiment.

FIG. 14 and FIG. 15 are processes of triggering split-screen displaying of a function by performing a slide operation. FIG. 14 and FIG. 15 are processes of triggering split-screen displaying of a function by performing a slide operation when a quantity of split-screen areas of a terminal device is 2.

For example, FIG. 14 is a schematic diagram of an interface of triggering split-screen displaying of a function based on a slide operation.

A user may perform two slide operations in opposite directions on an application in an active state. When a pressing force of the slide operation of the user is greater than a pressing threshold for triggering the application to perform sliding and dragging, the terminal device displays a split-screen display interface of a function of the application in the slide direction. For example, when the user simultaneously performs slide operations in upward and downward directions on the application, the terminal device displays upward and downward split-screen interfaces of functions. When the user simultaneously performs slide operations in leftward and rightward directions on the application, the terminal device displays upward and downward split-screen interfaces of functions.

In a possible implementation, when the pressing force of the user slide operation is less than or equal to the pressing threshold for triggering the application to execute sliding and dragging, the terminal device identifies that the user drag operation is invalid, and does not respond to the user slide operation.

For example, on an interface shown in a in FIG. 14, the user may simultaneously perform two slide operations in opposite upward and downward directions on an email icon 401 in an active state by using two hands. When a pressing force of the slide operation of the user is greater than a pressing threshold for triggering the application to perform sliding and dragging, a terminal device identifies the slide operations of the user in the upward and downward directions, triggers the terminal device to display two duplicated icons of the email in the upward and downward directions. The user continues the slide operation, and the terminal device displays two split-screen girds in the upward and downward slide directions, and simultaneously displays functions of the email corresponding to a plurality of duplicated icons in the upper and lower split-screen areas, as shown on an interface in b in FIG. 14.

The user releases the email icon 401 in the active state to end the slide operation. The terminal device may display interfaces corresponding to functions of the email on the interface shown in b in FIG. 14. The interfaces corresponding to the functions of the email may include an email list interface 1401 and a new email interface 1402.

In an understanding manner, the interfaces corresponding to the functions of the email displayed by the terminal device may be interfaces of functions corresponding to a screen splitting sequence of custom functions of the user, or interfaces of a plurality of functions of the user that have relatively high frequencies of using the email, or interfaces of functions memorized when the user recently performs split-screen displaying of the functions of the email.

For example, FIG. 15 is a schematic diagram of another interface of triggering split-screen displaying of a function based on a slide operation.

A difference between FIG. 15 and FIG. 14 is as follows: FIG. 15 is an interface of triggering split-screen displaying of a function based on a slide operation in which a user slides upward and downward, and FIG. 14 is an interface of triggering split-screen displaying of a function based on a slide operation in which a user slides leftward and rightward.

For example, on an interface shown in a in FIG. 15, the user may simultaneously perform two slide operations in opposite leftward and rightward directions on an email icon 401 in an active state by using two hands. When a pressing force of the slide operation of the user is greater than a pressing threshold for triggering the application to perform sliding and dragging, a terminal device identifies the slide operations of the user in the leftward and rightward directions, triggers the terminal device to display two duplicated icons of the email in the leftward and rightward directions. The user continues the slide operation, and the terminal device displays two split-screen girds in the leftward and rightward slide directions, and simultaneously displays functions of the email corresponding to a plurality of duplicated icons in the left and right split-screen areas, as shown on an interface in b in FIG. 15.

The user releases the email icon 401 in the active state to end the slide operation. The terminal device may display interfaces corresponding to functions of the email on the interface shown in b in FIG. 15. The interfaces corresponding to the functions of the email may include an email list interface 1501 and a new email interface 1502.

FIG. 16 is a process of triggering split-screen displaying of a function by performing a slide operation when a quantity of split-screen areas of a terminal device is 3. In an understanding manner, a user performs slide operations in opposite directions only once, and a terminal device can directly enter a display interface of three split-screens.

For example, FIG. 16 is a schematic diagram of an interface of triggering three-screen display of a function based on a slide operation.

For example, on an interface shown in a in FIG. 16, the user may simultaneously perform two slide operations in opposite leftward and rightward directions on an email icon 401 in an active state by using two hands. When a pressing force of the slide operation of the user is greater than a pressing threshold for triggering the application to perform sliding and dragging, a terminal device identifies the slide operations of the user in the leftward and rightward directions, triggers the terminal device to display three duplicated icons in the leftward and rightward slide directions. The user continues the slide operation, and the terminal device displays three split-screen girds in the leftward and rightward slide directions, and simultaneously displays functions of the email corresponding to a plurality of duplicated icons in the three left and right split-screen areas, as shown on an interface in b in FIG. 16.

The user releases the email icon 401 in the active state to end the slide operation. The terminal device may display interfaces corresponding to functions of the email on the interface shown in b in FIG. 16. The interfaces corresponding to the functions of the email may include an email list interface 1601, a new email interface 1602, and an inbox interface 1603.

Similarly, in FIG. 16, the method for triggering split-screen displaying of a function by performing a slide operation may also be applied to a multi-screen interface, and a slide and trigger manner is the same. Details are not described in this embodiment.

In FIG. 14 to FIG. 16, that an interface of one function is displayed in one split-screen area is used as an example for description. In a possible implementation, in any one of FIG. 14 to FIG. 16, if a user does not set a split-screen display manner of a function, and a quantity of functions of an application is greater than a quantity of a plurality of split-screen areas, a terminal device may display a plurality of function identifiers of the application in one split-screen area in a split-screen grid (the split-screen area may also be referred to as a first split-screen area), and/or display an interface corresponding to another function of the application in another split-screen area in the split-screen grid. The another function is different from the function displayed in the one split-screen area.

Figure 17:
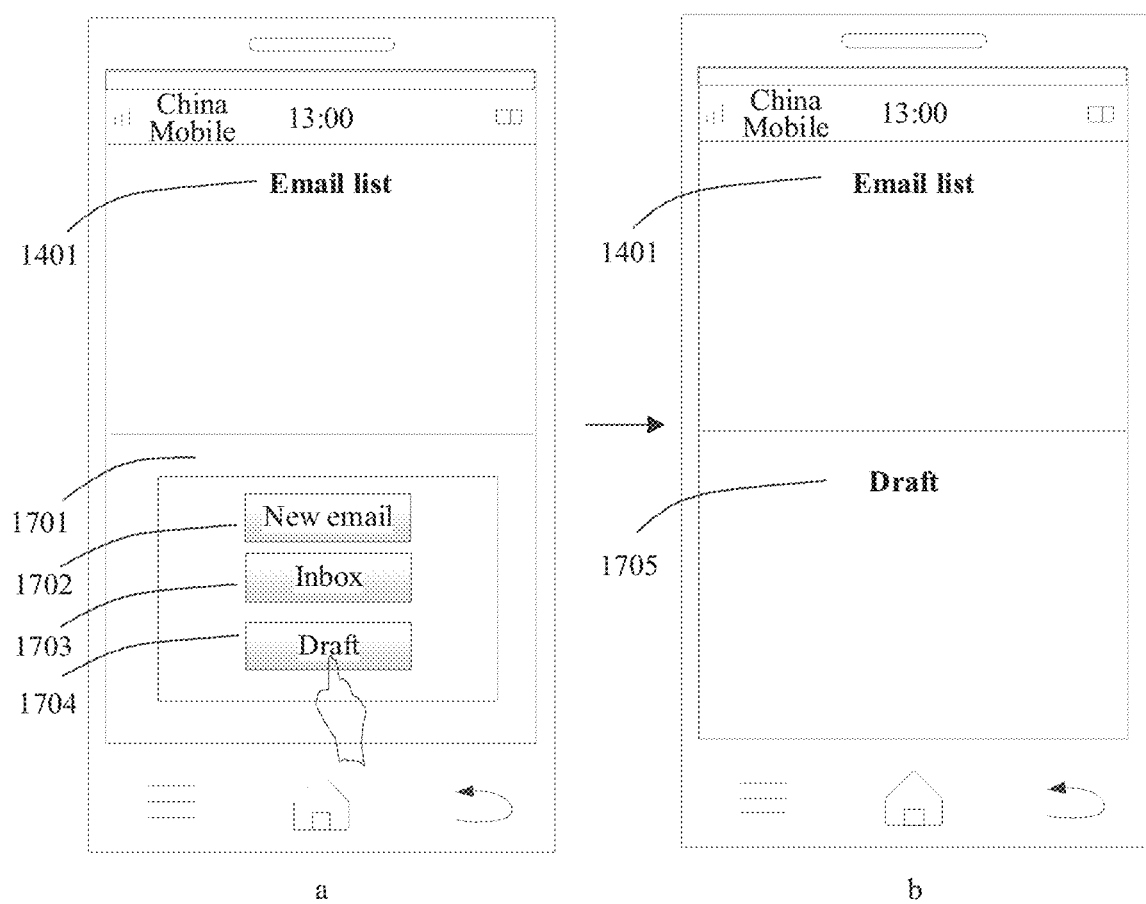
FIG. 17 is a schematic interface diagram in which a quantity of email is greater than a quantity of split-screen areas according to an embodiment of this application.

For example, FIG. 17 is a schematic diagram of an interface in which a quantity of functions of email is greater than a quantity of split-screen areas.

For example, when the quantity of functions of email is greater than the quantity of split-screen areas by 2, such as an interface shown in a in FIG. 17, a terminal device displays an email list interface 1401 in one of the split-screen areas, and displays identifiers of a plurality of functions of the email in the other split-screen area 1701. The identifiers of the plurality of functions of the email may include: a new email control 1702, an inbox control 1703, a draft control 1704, and another function control.

In a possible implementation, the user may trigger any function control in the split-screen area 1701 by performing an operation such as tapping or touching (which may also be referred to as a third operation) on the interface shown in a in FIG. 17. The terminal device displays, in the split-screen area, an interface corresponding to the function control in response to the trigger operation of the user.

For example, the user may tap the draft control 1704, and the terminal device displays, in the split-screen area 1701, an interface corresponding to the draft function in response to the operation that the user triggers the draft control, as shown in b in FIG. 17.

Figure 18:
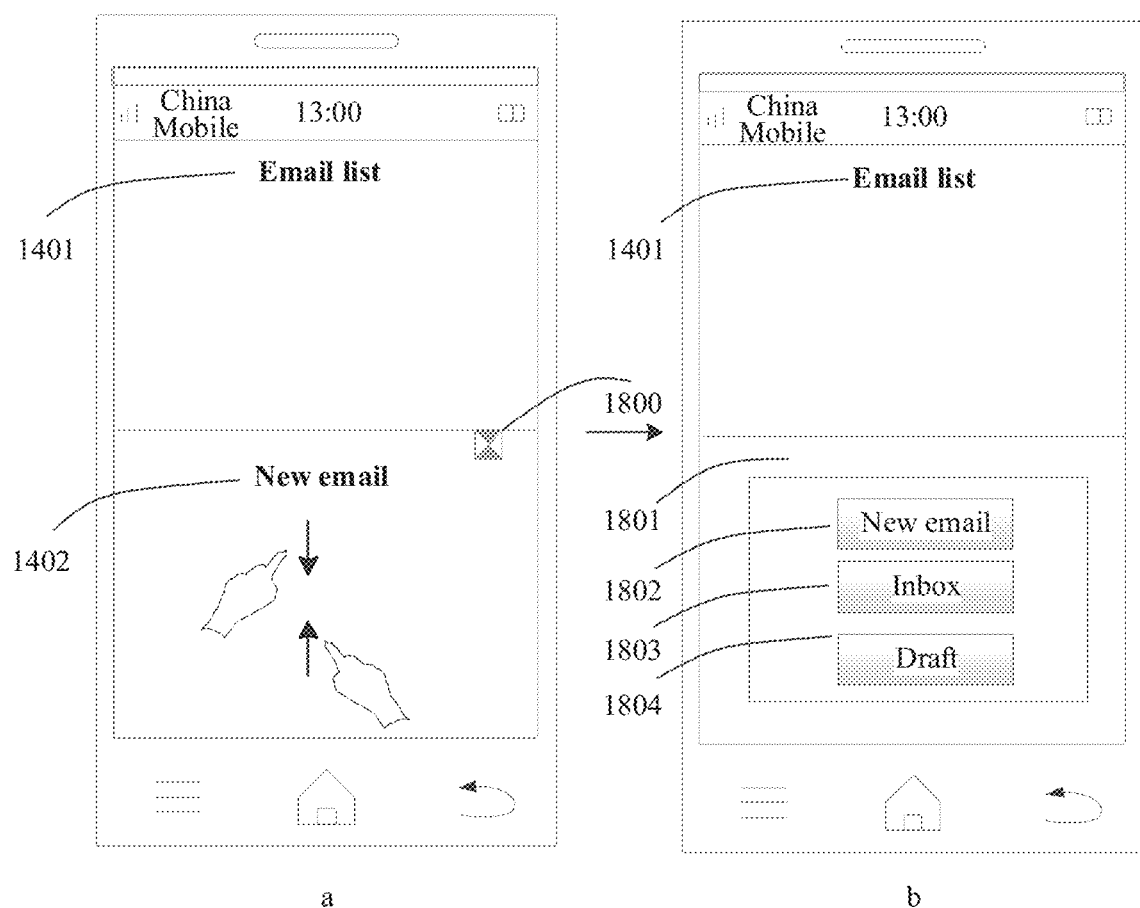
FIG. 18 is a schematic interface diagram of switching display of a split-screen area according to an embodiment of this application.

In a possible implementation, in the split-screen display interface shown in a in FIG. 18, the user may further perform operations such as switching and disabling on a function displayed in any split-screen area.

For example. FIG. 18 is a process of switching displaying of one of the split-screen areas.

As shown in FIG. 18, the user may switch a display interface of a split-screen area (the split-screen area may also be referred to as a second split-screen area) by performing an operation such as tapping, touching, or sliding (the operation may also be referred to as a fourth operation), and the terminal device displays, in the split-screen area, interfaces corresponding to identifiers of a plurality of other functions of the application in response to the operation of the user of switching the split-screen area. Further, by performing an operation such as tapping, touching, or sliding on any function item on the interfaces of the identifiers of the plurality of functions (this operation may also be referred to as a fifth operation), the user may switch the display interface of the split-screen area to an interface corresponding to the function item triggered by the user.

For example, on the interface shown in a in FIG. 18, when the user performs an operation of switching displaying of a split-screen area on a new email interface 1402, the user may slide the new email interface 1402 with two fingers in a same direction at the same time. The terminal device displays, in response to the slide operation of the user, identifiers of a plurality of functions of the email in the split-screen area in which the new email interface 1402 is located. The new email interface is switched to a split-screen area 1801 on an interface shown in b in FIG. 18. The split-screen area 1801 may include identifiers of a plurality of functions of the email, such as a new email control 1802, an inbox control 1803, a draft control 1804, and another function control.

In a possible implementation, the user may also trigger a switch control 1800 in the new email interface 1402 shown in a in FIG. 18. In response to the operation of triggering the switch control by the user, the terminal device displays identifiers of a plurality of functions of the email in a split-screen area corresponding to the new email interface, such as an interface shown in b in FIG. 18.

On the interface shown in b in FIG. 18, the user may continue to tap any function control in the split-screen area 1801 to switch a function of the split-screen area. For example, the user may tap the new email control 1801, and the terminal device displays, in the split-screen area 1801, an interface corresponding to the new email function.

Figure 19:
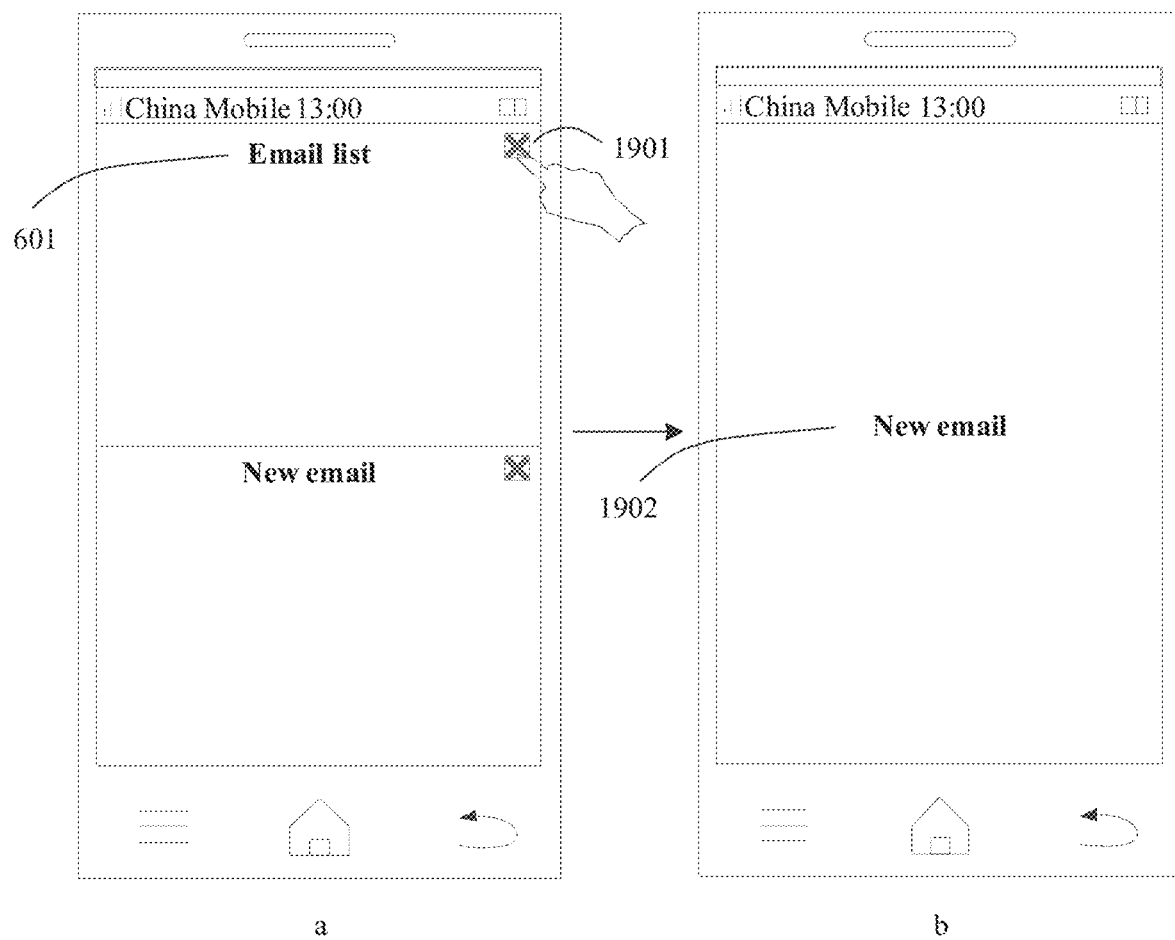
FIG. 19 is a schematic interface diagram of split-screen displaying of an exit function according to an embodiment of this application.
Figure 20:
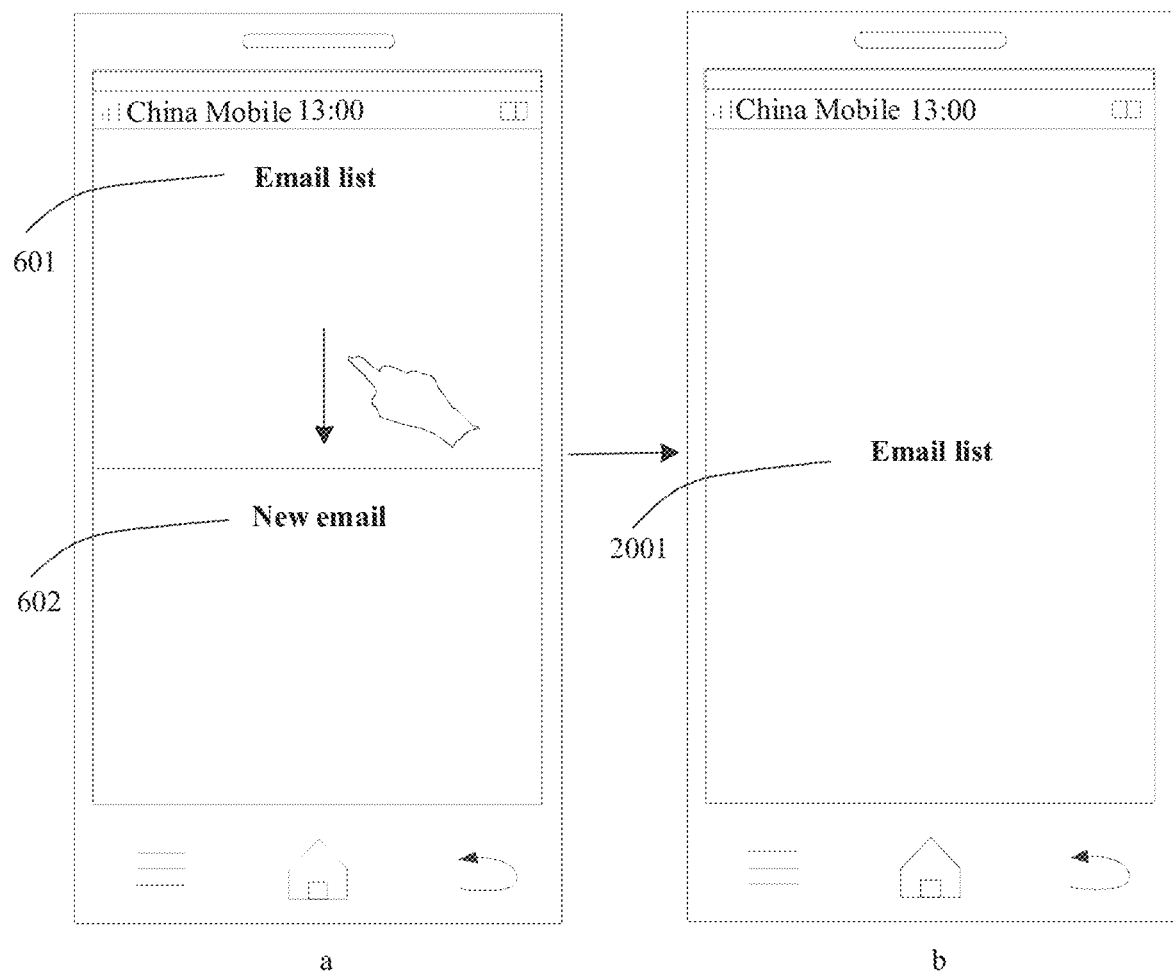
FIG. 20 is another schematic interface diagram of split-screen displaying of an exit function according to an embodiment of this application.

FIG. 19 and FIG. 20 are processes of exiting displaying of one of the split-screen areas.

In a possible understanding manner, in an implementation method of exiting a display process of one of the split-screen areas (the split-screen area may also be referred to as a third split-screen area), the user may trigger, by performing a corresponding operation (the operation may also be referred to as a sixth operation), the terminal device to exit displaying of one of the split-screen areas. The operation may include: The user triggers an operation of closing split-screen displaying of a function in any split-screen area, or the user triggers an operation of opening in full screen split-screen displaying of a function in any split-screen area. In a process in which a drag operation or a slide operation triggers split-screen displaying of a function, a method for exiting displaying of the split-screen area is the same.

For example, FIG. 19 is a schematic diagram of an interface of exiting split-screen displaying of a function.

For example, a user may trigger, on an interface shown in a in FIG. 19, to close an email list control 1901 by performing an operation such as tapping, touching, or sliding. A terminal device closes an email list interface 601 in response to the operation of exiting split-screen displaying of the function by the user, and the terminal device displays in full screen a new email interface 1902, such as an interface shown in bin FIG. 19.

For example. FIG. 20 is a schematic diagram of another interface of exiting split-screen displaying of a function.

A user may trigger a full-screen display operation of any split-screen area on an interface shown in a in FIG. 20 by performing an operation such as tapping, touching, or sliding. For example, the user may slide an email list interface 601 downward by one finger. A terminal deice closes a new email interface 602 in response to the operation of sliding the email list interface 601 by the user. The terminal device displays in full screen an email list interface 2001, such as an interface shown in b in FIG. 20.

It should be noted that the foregoing user interfaces of the terminal devices shown in FIG. 3 to FIG. 20 are used as examples, and do not constitute a limitation on the embodiments of this application. In other feasible implementations, all operations used to trigger to enter an application start interface or a page switching interface are user operations in the embodiments of this application. In a possible implementation, entering the application start interface or the page switching interface may alternatively be automatically triggered by the terminal device. This is not specifically limited in the embodiments of this application.

The foregoing describes the split-screen display method in the embodiments of this application. The following describes an apparatus for performing the split-screen display method provided in the embodiments of this application. A person skilled in the art may understand that the method and the apparatus may be mutually combined and referenced. The split-screen display apparatus provided in the embodiments of this application may perform the steps in the split-screen display method.

Figure 21:
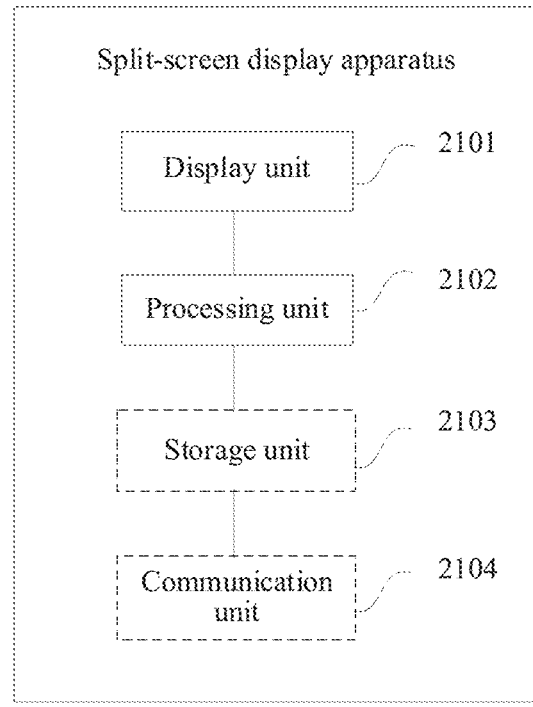
FIG. 21 is a schematic structural diagram of a split-screen display apparatus according to an embodiment of this application.

FIG. 21 is a schematic structural diagram of a split-screen display apparatus according to an embodiment of this application. The split-screen display apparatus may be the terminal device in the embodiments of this application, or may be a chip or a chip system in the terminal device. The split-screen display apparatus includes a display unit 2101 and a processing unit 2102. The processing unit 2102 is configured to receive a first operation for an application; the display unit 2101 is configured to display, in response to the first operation, an icon of the application as a first state on a display screen, where the first state is used to identify that a split-screen display operation can be performed for a plurality of functions of the application; the processing unit 2102 is further configured to receive a second operation for the icon in the first state; and the display unit 2101 is further configured to respectively display, in response to the second operation, interfaces corresponding to the plurality of functions of the application in a plurality of split-screen areas.

For example, the split-screen display apparatus is a terminal device or a chip or chip system applied to the terminal device. The display unit 2101 is configured to support the split-screen display apparatus to perform the display steps in the foregoing embodiments. The processing unit 2102 is configured to support the split-screen display apparatus to perform the processing steps in the foregoing embodiments.

The processing unit 2102 may be integrated with the display unit 2101, and communication may occur between the processing unit 2102 and the display unit 2101.

In a possible implementation, the split-screen display apparatus may further include a storage unit 2103. The storage unit 2103 may include one or more memories, and the memory may be one or more devices or components in a circuit that are used to store a program or data.

The storage unit 2103 may exist independently, and is connected to the processing unit 2102 by using a communications bus. The storage unit 2103 may alternatively be integrated with the processing unit 2102.

For example, the split-screen display apparatus may be a chip or a chip system of the terminal device in this embodiment of this application, and the storage unit 2103 may store computer executable instructions of the method of the terminal device, so that the processing unit 2102 performs the method of the terminal device in the foregoing embodiment. The storage unit 2103 may be a register, a cache, a random access memory (random access memory, RAM), or the like, and the storage unit 2103 may be integrated with the processing unit 2102. The storage trait 2103 may be a read-only memory (read-only memory, ROM) or another type of static storage device that may store static information and instructions, and the storage unit 2103 may be independent of the processing unit 2102.

In a possible implementation, the processing unit 2102 is specifically configured to receive a continuous touch operation for the icon in the first state and a plurality of drag operations; and the display unit 2101 is specifically configured to display, in response to each drag operation on a basis of the continuous touch operation for the icon in the first state, an interface corresponding to a function of the application in a split-screen area corresponding to the drag operation.

In a possible implementation, the display unit 2101 is specifically configured to display, in a split-screen area corresponding to an end position of the drag operation, the interface corresponding to the function of the application.

In a possible implementation, the display unit 2101 is specifically configured to display, in a split-screen area to which a drag direction of the drag operation points, the interface corresponding to the function of the application.

In a possible implementation, the display unit 2101 is specifically configured to: in a case that a pressing force of the drag operation is greater than a first pressure threshold, display, in the split-screen area to which the drag direction of the drag operation points, the interface corresponding to the function of the application.

In a possible implementation, the icon in the first state includes: the icon of the application and identifiers of the plurality of functions of the application; and the continuous touch operation includes a continuous touch operation for the icon of the application, and the drag operation includes a drag operation for the identifiers of the plurality of functions.

In a possible implementation, the processing unit 2102 is specifically configured to receive slide operations that slide in two different directions at the same time for the icon in the first state; and the display unit 2101 is specifically configured to: duplicate the icon of the application into a plurality of duplicated icons based on the directions of the slide operations, and display the plurality of duplicated icons in positions corresponding to the plurality of split-screen areas with the slide operations proceed, where the positions of the plurality of split-screen areas on the display screen are related to the directions of the slide operations; and in a case that the slide operations end, respectively display, in the plurality of split-screen areas, the interfaces corresponding to the plurality of functions of the application.

In a possible implementation, the display unit 2101 is specifically configured to: in a case that a pressing force of the slide operations is greater than a second pressure threshold, duplicate the icon of the application into a plurality of duplicated icons based on the directions of the slide operations, and respectively display the plurality of duplicated icons in the positions corresponding to the plurality of split-screen areas.

In a possible implementation, the display unit 2101 is specifically configured to: when the slide operation is an operation of sliding up and down relative to the display screen, the plurality of split-screen areas are split-screen areas in up and down directions relative to the display screen; or the display unit 2101 is further specifically configured to: when the slide operation is an operation of sliding left and right relative to the display screen, the plurality of split-screen areas are split-screen areas in left and right directions relative to the display screen.

In a possible implementation, the display unit 2101 is specifically configured to: in a case that a quantity of functions of the application is greater than a quantity of the plurality of split-screen areas, display identifiers of the plurality of functions of the application in a first split-screen area of the plurality of split-screen areas, and/or the display unit 2101 is further specifically configured to: respectively display corresponding interfaces of other functions of the application in other split-screen areas of the plurality of split-screen areas, where the other functions are different from those displayed in the first split-screen display area.

In a possible implementation, the processing unit 2102 is specifically configured to: receive a third operation for the identifiers of the plurality of functions of the application in the first split-screen area; and the display unit 2101 is specifically configured to: display, in the first split-screen area in response to the third operation, an interface of a function targeted by the third operation.

In a possible implementation, the display unit 2101 is specifically configured to: receive a setting operation for the application, where the setting operation is used to set interfaces of a plurality of specifically displayed first target functions when the interfaces of the plurality of functions of the application are displayed in the split-screen areas; and the display unit 2101 is further specifically configured to: respectively display, in response to the second operation, interfaces corresponding to the plurality of first target functions in the plurality of split-screen areas.

In a possible implementation, the display unit 2101 is specifically configured to: display a plurality of functions that are in the application and whose trigger frequencies meet a preset condition in a first time period, or a plurality of functions that are displayed when most recent split-screen displaying of a plurality of functions is performed in the application.

In a possible implementation, the processing unit 2102 is specifically configured to receive a fourth operation for a second split-screen area in the plurality of split-screen areas; and the display unit 2101 is specifically configured to switch a display interface of the second split-screen area to the identifiers of the plurality of functions of the application in response to the fourth operation.

In a possible implementation, the processing unit 2102 is specifically configured to: receive a fifth operation for the identifiers of the plurality of functions of the application in the second split-screen area; and the display unit 2101 is specifically configured to display, in the second split-screen area in response to the fifth operation, an interface of a function targeted by the fifth operation.

In a possible implementation, the processing unit 2102 is specifically configured to receive a sixth operation for a third split-screen area in the plurality of split-screen areas; and the display unit 2101 is specifically configured to display in full screen content displayed in the third split-screen area in response to the sixth operation.

In a possible implementation, the split-screen display apparatus may further include a communications unit 2104. The communications unit 2104 is configured to support interaction between the split-screen display apparatus and another device. For example, when the split-screen display apparatus is a terminal device, the communications unit 2104 may be a communications interface or an interface circuit. When the split-screen display apparatus is a chip or a chip system in a terminal device, the communications unit 2104 may be a communications interface. For example, the communications interface may be an input/output interface, a pin, or a circuit.

The apparatus in this embodiment may be accordingly used to perform the steps in the method embodiment, implementation principles and technical effects of the apparatus and the method embodiment are similar, and details are not described herein again.

Figure 22:
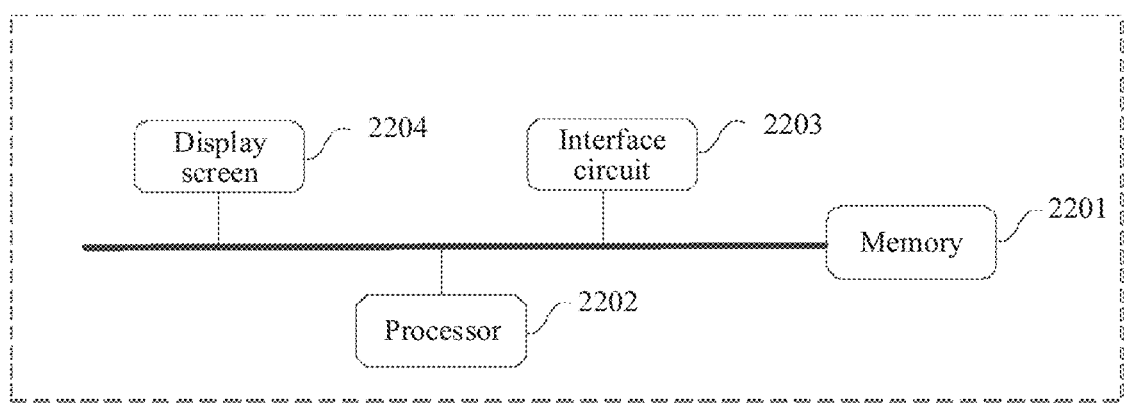
FIG. 22 is a schematic structural diagram of hardware of a split-screen display apparatus according to an embodiment of this application.

FIG. 22 is a schematic structural diagram of hardware of a split-screen display apparatus according to an embodiment of this application. Referring to FIG. 22, the network management apparatus includes a memory 2201, a processor 2202, and a display screen 2204. The communications apparatus may further include an interface circuit 2203, where the memory 2201, the processor 2202, the interface circuit 2203, and the display screen 2204 may communicate. For example, the memory 2201, the processor 2202, the interface circuit 2203, and the display screen 2204 may communicate with each other by using a communications bus. The memory 2201 is configured to store computer executable instructions, and is controlled by the processor 2202 to execute the instructions, and displaying is performed by the display screen 2204, thereby implementing the split-screen display method provided in the following embodiments of this application.

In a possible implementation, the computer executable instructions in this embodiment of this application may also be referred to as application code. This is not specifically limited in this embodiment of this application.

Optionally, the interface circuit 2203 may further include a transmitter and/or a receiver. Optionally, the processor 2202 may include one or more CPUs, or may be another general-purpose processor, a digital signal processor (digital signal processor, DSP), an application specific integrated circuit (application specific integrated circuit, ASIC), or the like. The general-purpose processor may be a microprocessor, or the processor may be any conventional processor or the like. The steps of the methods disclosed with reference to this application may be directly implemented by a hardware processor, or may be implemented by a combination of hardware and a software module in a processor.

An embodiment of this application further provides a computer readable storage medium. All or some of methods in the foregoing embodiments may be implemented by using software, hardware, firmware, or any combination thereof. If implemented in software, a function may be stored on or transmitted on a computer readable medium as one or more instructions or code. The computer readable medium may include a computer storage medium and a communications medium, and may further include any medium that can transmit a computer program from one place to another. The storage medium may be any target medium accessible by a computer.

In a possible implementation, the computer readable medium may include a RAM, a ROM, a compact disc read-only memory (compact disc read-only memory, CD-ROM) or another optical disk memory, a magnetic disk memory or another magnetic storage device, or any other medium that is to carry or store required program code in a form of an instruction or a data structure, and may be accessed by a computer. Furthermore, any connection is appropriately referred to as a computer readable medium. For example, if software is transmitted from a website, a server or another remote source by using a coaxial cable, an optical fiber cable, a twisted pair, a digital subscriber line (Digital Subscriber Line, DSL) or wireless technologies (such as infrared ray, radio, and microwave), the coaxial cable, optical fiber cable, twisted pair, DSL or wireless technologies such as infrared ray, radio, and microwave are included in the definition of the medium. A magnetic disk and an optical disc used herein include an optical disc, a laser disc, an optical disc, a digital versatile disc (Digital Versatile Disc, DVD), a floppy disk, and a blue ray disc, where the magnetic disk generally reproduces data in a magnetic manner, and the optical disc reproduces data optically by using laser. The foregoing combination should also be included in the scope of the computer readable medium.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processing unit of any other programmable data processing device to generate a machine, so that the instructions executed by a computer or a processing unit of any other programmable data processing device generate an apparatus for implementing a specific function in one or more processes in the flowcharts and/or in one or more blocks in the block diagrams.

The foregoing specific implementations further describe the objectives, technical solutions in detail, and beneficial effects of the present invention. It should be appreciated that the foregoing descriptions are merely specific implementations of the present invention, but are not intended to limit the protection scope of the present invention. Any modification, equivalent replacement, or improvement made based on the technical solutions of the present invention should fall within the protection scope of the present invention.

What is claimed is:

1. A split-screen display method for an electronic device, wherein the electronic device comprises a display screen, and wherein the display screen comprises a plurality of split-screen areas, the method comprising:
    receiving a first operation for an application;
    displaying, in response to the first operation, an icon of the application as a first state on the display screen, wherein the first state identifies that a split-screen display operation can be performed for a plurality of functions of the application;
    receiving a second operation for the icon in the first state, wherein the second operation comprises a continuous touch operation for the icon in the first state and a plurality of drag operations; and
    respectively displaying, in response to the second operation, interfaces corresponding to the plurality of functions of the application in the plurality of split-screen areas,
    wherein respectively displaying, in response to the second operation, interfaces corresponding to the plurality of functions of the application in the plurality of split-screen areas comprises displaying, in response to each drag operation and based on the continuous touch operation for the icon in the first state, an interface corresponding to a function of the application in a split-screen area corresponding to the drag operation, and
    wherein the application is not opened prior displaying the interfaces in the plurality of split-screen areas.

2. The method of claim 1, wherein displaying the interface corresponding to a function of the application in a split-screen area corresponding to the drag operation comprises displaying, in a split-screen area corresponding to an end position of the drag operation, the interface corresponding to the function of the application.

3. The method of claim 1, wherein displaying the interface corresponding to a function of the application in a split-screen area corresponding to the drag operation comprises displaying, in a split-screen area to which a drag direction of the drag operation points, the interface corresponding to the function of the application.

4. The method of claim 3, wherein displaying, in the split-screen area to which a drag direction of the drag operation points, the interface corresponding to the function of the application comprises, displaying, in the split-screen area to which the drag direction of the drag operation points, the interface corresponding to the function of the application in response to a pressing force of the drag operation being greater than a first pressure threshold.

5. The method of claim 1, wherein the icon in the first state comprises the icon of the application and identifiers of the plurality of functions of the application, wherein the continuous touch operation comprises a continuous touch operation for the icon of the application, and wherein the drag operation comprises a drag operation for the identifiers of the plurality of functions.

6. The method of claim 1, wherein receiving the second operation for the icon in the first state further comprises receiving slide operations that slide in two different directions at the same time for the icon in the first state,
    wherein respectively displaying, in response to the second operation, interfaces corresponding to the plurality of functions of the application in the plurality of split-screen areas comprises:
        duplicating the icon of the application into a plurality of duplicated icons based on the directions of the slide operations;
        displaying the plurality of duplicated icons in positions corresponding to the plurality of split-screen areas to which the slide operations proceed, wherein the positions of the plurality of split-screen areas on the display screen are related to the directions of the slide operations; and
        respectively displaying, in the plurality of split-screen areas, the interfaces corresponding to the plurality of functions of the application in response to the slide operations ending.

7. The method of claim 6, wherein duplicating the icon of the application into a plurality of duplicated icons based on the directions of the slide operations, and displaying the plurality of duplicated icons in positions corresponding to the plurality of split-screen areas to which the slide operations proceed is in response to a pressing force of the slide operations being greater than a second pressure threshold.

8. The method of claim 6, wherein either a) when the slide operation is an operation of sliding up and down relative to the display screen, the plurality of split-screen areas are split-screen areas in up and down directions relative to the display screen, or b) when the slide operation is an operation of sliding left and right relative to the display screen, the plurality of split-screen areas are split-screen areas in left and right directions relative to the display screen.

9. The method of claim 1, wherein respectively displaying interfaces corresponding to the plurality of functions of the application in the plurality of split-screen areas comprises, in response to a quantity of functions of the application being greater than a quantity of the plurality of split-screen areas, displaying identifiers of the plurality of functions of the application in a first split-screen area of the plurality of split-screen areas, and respectively displaying corresponding interfaces of other functions of the application in other split-screen areas of the plurality of split-screen areas, wherein the other functions are different from those displayed in the first split-screen area.

10. The method of claim 9, further comprising:
receiving a third operation for the identifiers of the plurality of functions of the application in the first split-screen area; and
displaying, in the first split-screen area in response to the third operation, an interface of a function targeted by the third operation.

11. The method of claim 1, further comprising receiving a setting operation for the application, wherein the setting operation is used to sets interfaces of a plurality of specifically displayed first target functions when the interfaces of the plurality of functions of the application are displayed in the split-screen areas,
wherein respectively displaying, in response to the second operation, interfaces corresponding to the plurality of functions of the application in the plurality of split-screen areas comprises respectively displaying, in response to the second operation, interfaces corresponding to the plurality of first target functions in the plurality of split-screen areas.

12. The method of claim 1, wherein respectively displaying interfaces corresponding to the plurality of functions of the application in the plurality of split-screen areas comprises respectively displaying, in the plurality of split-screen areas, interfaces corresponding to a plurality of second target functions of the application,
wherein the plurality of second target functions comprise either a) a plurality of functions that are in the application and have trigger frequencies that meet a preset condition in a first time period, or b) a plurality of functions that are displayed when most recent split-screen displaying of a plurality of functions is performed in the application.

13. The method of claim 1, wherein after respectively displaying interfaces corresponding to the plurality of functions of the application in the plurality of split-screen areas, the method further comprises:
receiving a fourth operation for a second split-screen area in the plurality of split-screen areas; and
switching a display interface of the second split-screen area to the identifiers of the plurality of functions of the application in response to the fourth operation.

14. The method of claim 13, further comprising:
receiving a fifth operation for the identifiers of the plurality of functions of the application in the second split-screen area; and
displaying, in the second split-screen area in response to the fifth operation, an interface of a function targeted by the fifth operation.

15. The method of claim 1, further comprising:
receiving a sixth operation for a third split-screen area in the plurality of split-screen areas; and
displaying in full screen content displayed in the third split-screen area in response to the sixth operation.

16. An electronic device, comprising:
a processor;
a display screen coupled to the processor and comprising a plurality of split-screen areas; and
a memory coupled to the processor and configured to store a program that, when executed by the processor, causes the electronic device to be configured to:
receive a first operation for an application;
display, in response to the first operation, an icon of the application as a first state on the display screen, wherein the first state identifies that a split-screen display operation can be performed for a plurality of functions of the application;
receive a second operation for the icon in the first state, wherein the second operation comprises a continuous touch operation for the icon in the first state and a plurality of drag operations; and
respectively display, in response to the second operation, interfaces corresponding to the plurality of functions of the application in the plurality of split-screen areas,
wherein respectively displaying, in response to the second operation, interfaces corresponding to the plurality of functions of the application in the plurality of split-screen areas comprises displaying, in response to each drag operation and based on the continuous touch operation for the icon in the first state, an interface corresponding to a function of the application in a split-screen area corresponding to the drag operation, and
wherein the application is not opened prior displaying the interfaces in the plurality of split-screen areas.

17. A computer-readable storage medium containing instructions that, when executed by a processor of an electronic device, cause the electronic device to be configured to:
receive a first operation for an application;
display, in response to the first operation, an icon of the application as a first state on a display screen, wherein the first state identifies that a split-screen display operation can be performed for a plurality of functions of the application;
receive a second operation for the icon in the first state, wherein the second operation comprises a continuous touch operation for the icon in the first state and a plurality of drag operations; and
respectively display, in response to the second operation, interfaces corresponding to the plurality of functions of the application in a plurality of split-screen areas of the display screen,
wherein respectively displaying, in response to the second operation, interfaces corresponding to the plurality of functions of the application in the plurality of split-screen areas comprises displaying, in response to each drag operation and based on the continuous touch operation for the icon in the first state, an interface corresponding to a function of the application in a split-screen area corresponding to the drag operation, and
wherein the application is not opened prior displaying the interfaces in the plurality of split-screen areas.

18. The electronic device of claim 16, wherein displaying the interface corresponding to a function of the application in a split-screen area corresponding to the drag operation comprises displaying, in a split-screen area corresponding to an end position of the drag operation, the interface corresponding to the function of the application.

19. The electronic device of claim 16, wherein displaying the interface corresponding to a function of the application in a split-screen area corresponding to the drag operation comprises displaying, in a split-screen area to which a drag direction of the drag operation points, the interface corresponding to the function of the application.

20. The electronic device of claim 16, wherein the icon in the first state comprises the icon of the application and identifiers of the plurality of functions of the application, wherein the continuous touch operation comprises a continuous touch operation for the icon of the application, and wherein the drag operation comprises a drag operation for the identifiers of the plurality of functions.

* * * * *